United States Patent
Takahashi et al.

(10) Patent No.: US 6,212,881 B1
(45) Date of Patent: Apr. 10, 2001

(54) EXHAUST GAS RECIRCULATION MECHANISM FOR ENGINE AND METHOD FOR CONTROLLING EXHAUST GAS RECIRCULATION VALVE

(75) Inventors: Jun Takahashi; Hiroyuki Mizuno, both of Toyota; Hironao Kishi, Nagoya, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/357,885

(22) Filed: Jul. 21, 1999

(30) Foreign Application Priority Data

Aug. 17, 1998 (JP) .................................. 10-230908

(51) Int. Cl.$^7$ ...................................................... F01N 3/00
(52) U.S. Cl. .................... 60/274; 60/278; 123/568.15; 123/568.21; 123/568.22
(58) Field of Search .................... 60/278; 123/568.15, 123/568.21, 568.22, 295, 571

(56) References Cited

U.S. PATENT DOCUMENTS

| | | | |
|---|---|---|---|
| 4,210,112 | * 7/1980 | Nakamura et al. | 123/571 |
| 4,364,368 | 12/1982 | Blanchette . | |
| 4,378,777 | 4/1983 | Iida et al. . | |
| 4,757,683 | * 7/1988 | Kawanabe et al. | 60/278 |
| 5,172,550 | * 12/1992 | Takeshima | 60/278 |
| 5,426,934 | * 6/1995 | Hunt et al. | 60/278 |
| 5,546,915 | 8/1996 | Isobe . | |
| 5,632,144 | * 5/1997 | Isobe | 60/278 |
| 5,711,149 | * 1/1998 | Araki | 60/278 |
| 5,848,580 | * 12/1998 | Mashiki | 123/295 |

FOREIGN PATENT DOCUMENTS

| | | | |
|---|---|---|---|
| 19640161 | * 4/1998 | (DE) | 60/278 |
| 57-062954 | 4/1982 | (JP) . | |
| 406108926 | * 4/1994 | (JP) | 60/278 |
| 7-180615 | 7/1995 | (JP) . | |
| 7-293355 | 11/1995 | (JP) . | |
| 8-303307 | 11/1996 | (JP) . | |
| 408326595 | * 12/1996 | (JP) | 60/278 |

* cited by examiner

*Primary Examiner*—Thomas Denion
*Assistant Examiner*—Thai-Ba Trieu
(74) *Attorney, Agent, or Firm*—Oliff & Berridge PLC.

(57) ABSTRACT

An exhaust gas recirculation mechanism of an engine. Some of exhaust gas discharged from combustion chambers is recirculated to the combustion chambers through an EGR passage. An EGR valve is located in the EGR passage for adjusting the amount of recirculated exhaust gas. Foreign matter contained in exhaust gas in the EGR passage adheres to a valve shaft of the EGR valve that is exposed in the EGR passage. Normally, the opening amount of the EGR valve is controlled in accordance with the running state of the engine. If the opening amount of the EGR valve, which is determined based on the running state of the engine, is greater than a predetermined value, an ECU judges that the EGR ratio will fall within an acceptable range even if the EGR valve is fully opened from the current position. The ECU therefore forces the EGR valve to open fully. As a result, the foreign matter adhered to the valve shaft is removed without deteriorating the running condition of the engine.

20 Claims, 17 Drawing Sheets

| Injection Mode | Target Air-Fuel Ratio | Injection Timing |
|---|---|---|
| R1 | High Air-Fuel Ratio | Compression Stroke |
| R2 | | Intake And Compression Strokes |
| R3 | Theoretical Air-Fuel Ratio | Intake Stroke |
| R4 | | |

EXHAUST GAS RECIRCULATION MECHANISM FOR ENGINE AND METHOD FOR CONTROLLING EXHAUST GAS RECIRCULATION VALVE

BACKGROUND OF THE INVENTION

The present invention relates to an exhaust gas recirculation (EGR) mechanism for engine and a method for controlling an exhaust gas recirculation valve. More particularly, the present invention pertains to a technique for optimally activating an EGR valve located in an EGR passage.

A typical engine has an EGR mechanism for reducing nitrogen oxide in exhaust gas by recirculating some of exhaust gas from an exhaust pipe to an intake pipe. The EGR mechanism includes an EGR passage connecting the exhaust pipe with the intake pipe and an EGR valve located in the EGR passage. The opening amount of the EGR valve must be finely controlled for optimizing the amount of the recirculation of exhaust gas. A typical EGR valve is a poppet valve, which includes a valve shaft and a valve body. The valve shaft is moved by an actuator in the axial direction. The valve body is secured to the distal end of the valve shaft and is located in the EGR passage. The valve shaft is supported by a seal member in the EGR passage.

As exhaust gas flows in the EGR passage, a deposit develops on a part of the valve shaft exposed in the EGR passage. The developed deposit is removed as the valve shaft slides on the seal member. However, the valve body is sometimes moved within a small range for a relatively long period without being fully opened. In this case, only a limited portion of the valve shaft slides on the seal member. Therefore, the deposit remains on part of the valve shaft that is located in the EGR passage and does not slide on the seal member. The remaining deposit is firmly adhered to the valve shaft. The adhered deposit cannot be easily removed even if the corresponding part of the valve shaft slides on the seal member when the valve shaft moves to fully open the valve body. The adhered deposit hinders smooth movement of the valve body and prevents the EGR valve from being accurately controlled.

To prevent valve shaft deposits, the EGR valve may be forced fully open when the engine is running. However, this would deteriorate the combustion of the engine, which would lower the power of the engine and the fuel economy and deteriorate the emissions. Thus, it is problematic to fully open the EGR valve for the purpose of removing deposits on the valve shaft while the engine is running.

Japanese Unexamined Patent Publication No 8-303307 discloses a device that moves an EGR valve between a fully open position and a fully closed position when an engine is stopped. Moving the EGR valve between the fully open position and the fully closed position when the engine is stopped completely removes deposits on the valve shaft. In other words, the device prevents deposits from adhering to the valve shaft.

However, if the engine is started again immediately after it is stopped, the engine is started with the EGR valve widely opened. This prevents the combustion chambers from getting sufficient oxygen, which makes the starting of the engine unsatisfactory.

Japanese Unexamined Patent Publication No. 7-293355 discloses a device that fully opens an EGR valve when an ignition switch is turned on for starting an engine. However, like the device of Publication No 8-303307, the device of Publication No. 7-293355 starts the engine with the EGR valve widely open and therefore hinders the starting of the engine.

SUMMARY OF THE INVENTION

Accordingly, it is an objective of the present invention to provide an exhaust gas recirculation mechanism for an engine and a method for controlling an exhaust gas recirculation valve that remove deposits on a valve shaft without deteriorating the running state of the engine.

To achieve the foregoing and other objectives and in accordance with the purpose of the present invention an exhaust gas recirculation mechanism for an engine is provided. The mechanism includes a combustion chamber, an intake passage for supplying air to the combustion chamber, an exhaust passage for discharging exhaust gas from the combustion chamber, a recirculation passage, an EGR valve, an adjuster and a controller. The recirculation passage connects the exhaust passage with the intake passage for supplying some of exhaust gas from the exhaust passage to the intake passage. The EGR valve is located in the recirculation passage and serves to adjust the amount of exhaust gas recirculated to the intake passage. Foreign matter in exhaust gas in the recirculation passage adheres to part of the EGR valve that is exposed in the recirculation passage. The adjuster adjusts the opening amount of the EGR valve in accordance with the running state of the engine. The controller forces the EGR valve fully open when a predetermined full open condition is satisfied while the engine is running thereby removing the foreign matter from the exposed part of the EGR valve. The ratio of the amount of recirculated exhaust gas to the amount of air supplied to the combustion chamber is represented by an EGR ratio. The full open condition is a condition in which fluctuations of the EGR ratio will fall within a predetermined acceptable range if the EGR valve is fully opened.

The present invention may also be embodied as a method for controlling an EGR valve of an engine. The method includes adjusting the opening amount of the EGR valve in accordance with the running state of the engine and forcing the EGR valve fully open when a predetermined full open condition is satisfied while the engine is running thereby removing the foreign matter from the exposed part of the EGR valve. The ratio of the amount of recirculated exhaust gas to the amount of air supplied to the combustion chamber is represented by an EGR ratio. The full open condition is a condition in which fluctuations of the EGR ratio will fall within a predetermined acceptable range if the EGR valve is fully opened.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
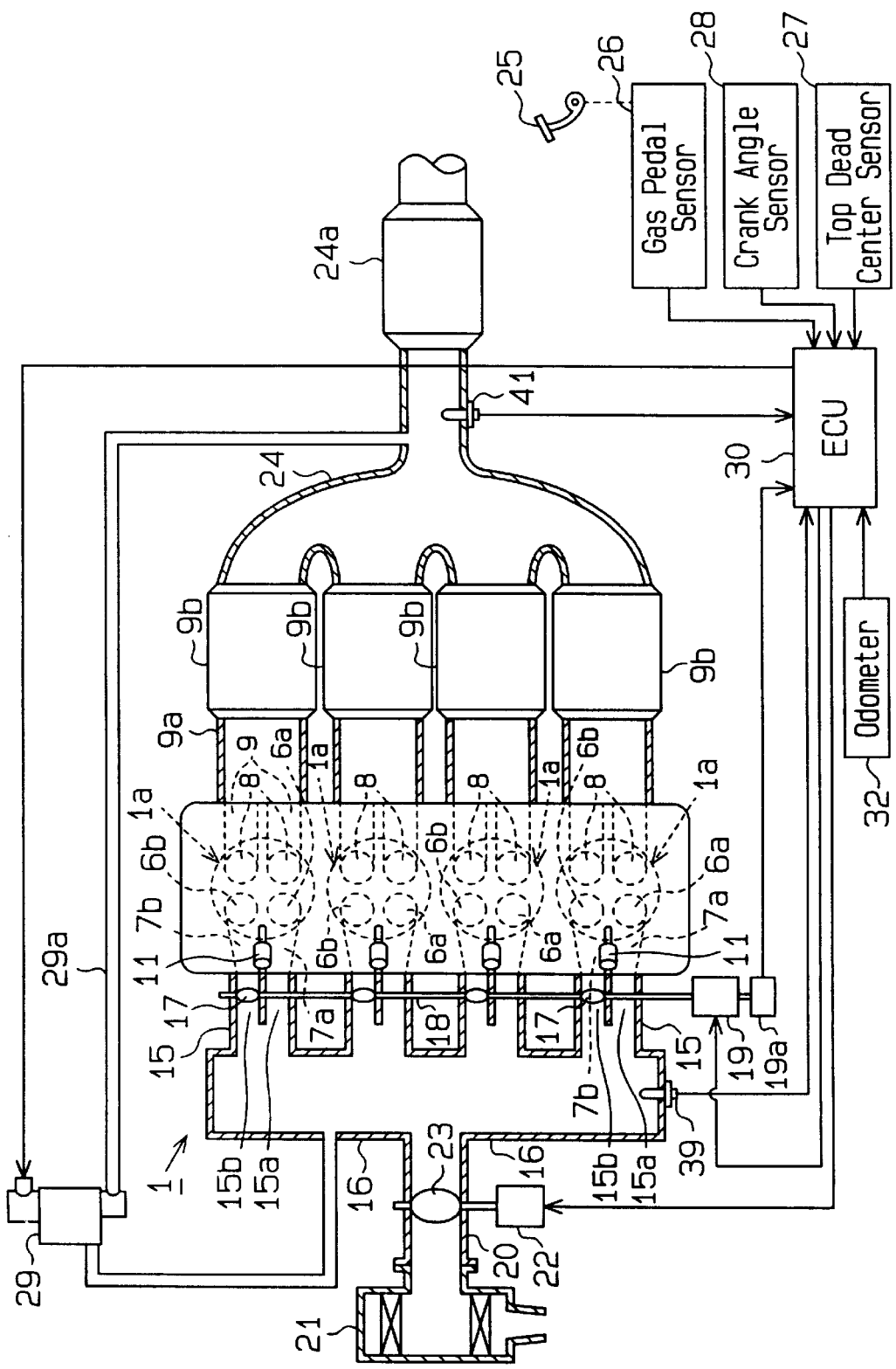
FIG. 1 is a diagrammatic view showing a cylinder injection type engine and an EGR mechanism according to one embodiment of the present invention.

A direct cylinder injection type engine 1 according to a first embodiment of the present invention will now be described with reference to FIGS. 1 to 13. FIG. 1 shows the engine 1 and an exhaust gas recirculation (EGR) mechanism. The engine 1 includes a cylinder block 2. Four cylinders 1a are formed in the cylinder block 2. As illustrated in FIGS. 1 to 5, a piston 3 is reciprocally accommodated in each cylinder 1a. A cylinder head 4 is arranged on top of the cylinder block 2. A combustion chamber 5 is defined between the piston 3 and the cylinder head 4 in each cylinder 1a.

Each cylinder 1a is provided with four valves. The four valves include a first intake valve 6a, a second intake valve 6b, and two exhaust valves 8. The first intake valve 6a is arranged in correspondence with a first intake port 7a, while the second intake valve 6b is arranged in correspondence with a second intake port 7b. In the same manner, each of the two exhaust valves 8 is arranged in correspondence with an exhaust port 9. The first and second intake ports 7a, 7b and the two exhaust ports are defined in the cylinder head 4.

Figure 2:
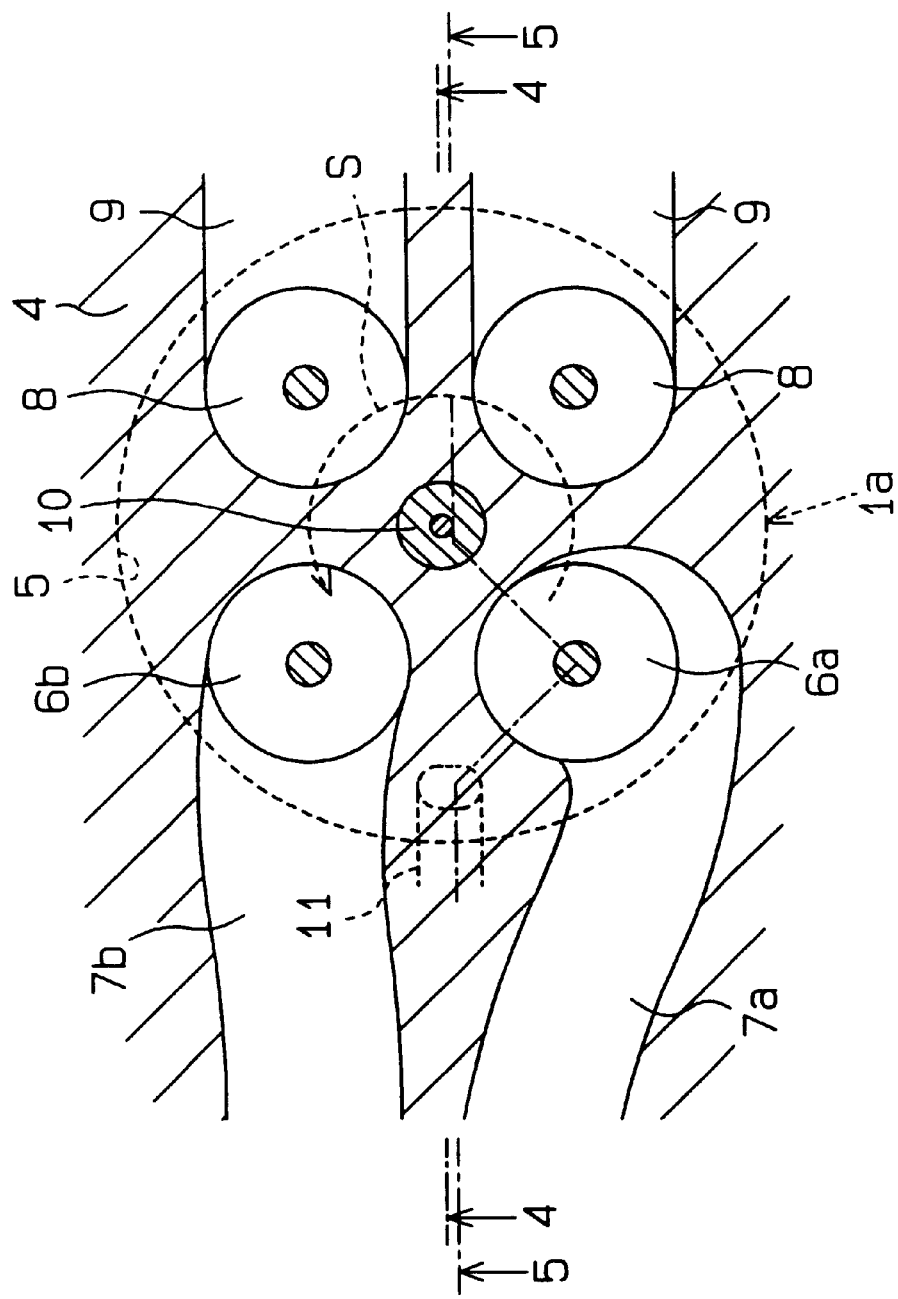
FIG. 2 is a diagrammatic cross-sectional view showing a cylinder of the engine of FIG. 1.

As shown in FIG. 2, the first intake port 7a is a helical port that extends in a helical manner. The second intake port 7b extends in a generally straight manner. A spark plug 10 is arranged in correspondence with each combustion chamber 5 at the middle section of the cylinder head 4. A fuel injector 11 is arranged in the vicinity of each set of first and second intake valves 6a, 6b on the inner wall of the cylinder head 4.

Figure 3:
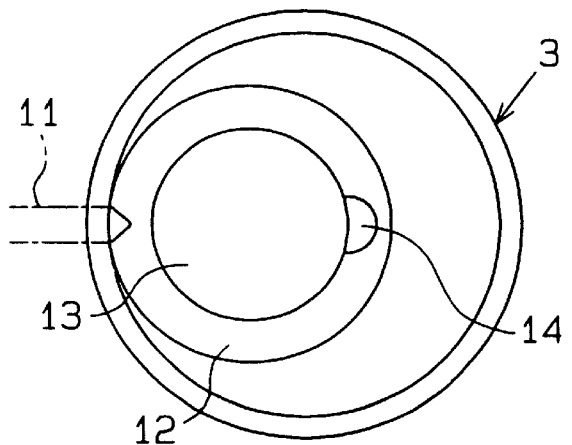
FIG. 3 is a plan view showing the top of a piston in the engine of FIG. 1.
Figure 4:
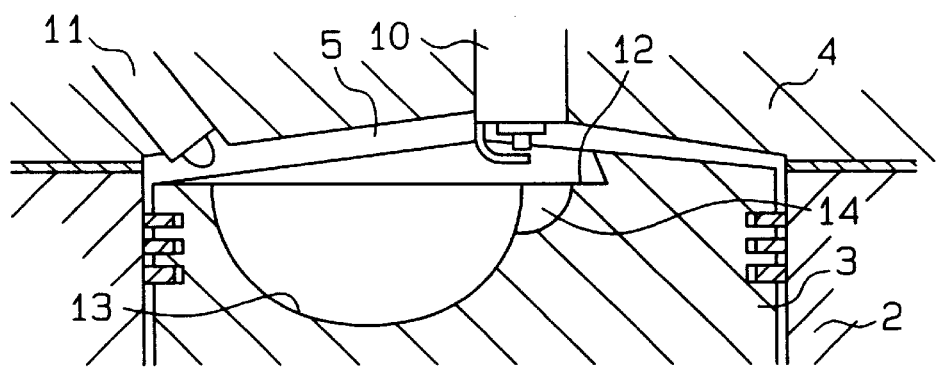
FIG. 4 is a cross-sectional view taken along line 4—4 of FIG. 2.
Figure 5:
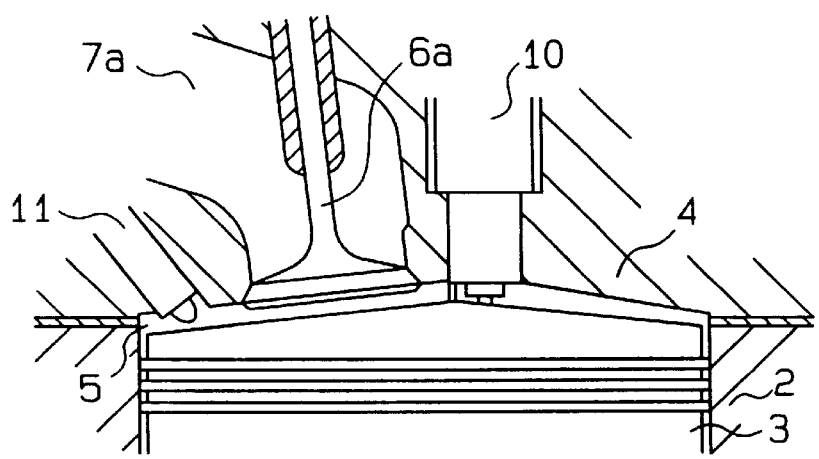
FIG. 5 is a cross-sectional view taken along line 5—5 of FIG. 2.

As shown in FIGS. 3 and 4, a substantially circular dish 12 is formed in the top portion of each piston 3. The dish 12 extends from directly below the fuel injector 11 to directly below the spark plug 10. A semispherical bowl 13 is formed in the center of the dish 12. A curved recess 14 is formed between the dish 12 and the bowl directly below the spark plug 10.

As shown in FIG. 1, the first and second intake ports 7a, 7b of each cylinder 1a are connected to a surge tank 16 by a first intake passage 15a and a second intake passage 15b, respectively. The first and second intake passages 15a, 15b extend through an intake manifold 15. A swirl control valve (SCV) 17 is arranged in each second intake passage 15b. The SCVs 17 are connected to a motor 19 (a DC motor or a step motor) by a common shaft 18. The motor 19 is controlled by an electronic control unit (ECU) 30. The surge tank 16 is connected to an air cleaner 21 through an intake duct 20. A throttle valve 23, which is actuated by a motor 22 (a DC motor or a step motor), is arranged in the intake duct 20.

The exhaust ports 9 of each cylinder 1a are connected to a first three-way catalyst converter 9b by an exhaust passage 9. In other words, each cylinder 1a is connected to one of the four first three-way catalyst converters 9b. The upstream three-way catalyst converters 9b are connected to an exhaust manifold 24. A downstream three-way catalyst converter 24a is located at the downstream side of the exhaust manifold 24. The upstream three-way catalyst converters 9b are normal type three-way converters. The downstream three-way catalyst converter 24a is a nitrogen oxide occlusion reduction type. When the air-fuel ratio is high, that is, when the air-fuel mixture is lean, the amount of nitrogen oxide in exhaust gas increases, and the upstream three-way catalyst converters 9b cannot reduce all the nitrogen oxide in the exhaust gas. In this case, the downstream three-way catalyst converter 24a adsorbs and stores nitrogen oxide, which prevents nitrogen oxide from escaping to the atmosphere. If the downstream converter 24a is almost saturated with nitrogen oxide, rich-spike control is performed. That is, the air-fuel ratio is temporarily lowered for reducing nitrogen oxide occluded in the downstream converter 24a, which decreases the amount of adsorbed nitrogen oxide.

The exhaust manifold 24 is connected to the surge tank 16 by an EGR passage 29a. The EGR passage 29a recirculates some of the exhaust gas in the exhaust manifold to the surge tank 16. An EGR valve 29 is located in the EGR passage 29a.

The ECU 30, which is a digital computer, conducts various control operations such as combustion control of the engine 1 and the opening amount control of the EGR valve 29. Although not shown in the drawings, the ECU 30 includes a CPU, a ROM, a RAM, a standby RAM, an input port, an output port, an AD converter and various drivers, which are connected with one another by a bidirectional bus.

A gas pedal 25 is connected to a gas pedal sensor 26. When the driver depresses the gas pedal 25, the gas pedal sensor 26 generates voltage proportional to the degree of depression, or position, of the gas pedal 25 and outputs the voltage to the ECU 30.

A top dead center sensor 27 generates a pulse signal when the piston in a certain cylinder 1a reaches its top dead center position during the intake stroke and outputs the pulse to the ECU 30. A crank angle sensor 28 generates a pulse signal each time a crankshaft (not shown) of the engine 1 is rotated, for example, by thirty degrees. The CPU 30 calculates the crank angle based on the pulses from the sensors 27, 28 and calculates the engine speed based on the pulses from the crank angle sensor 28.

An SCV sensor 19*a* is located at one end of the shaft 18. The SCV sensor 19*a* generates voltage proportional to the opening amount of the SCVs 17 and outputs the voltage to the ECU 30. An intake pressure sensor 39 generates voltage proportional to the suction pressure PM (absolute pressure) and outputs the voltage to the ECU 30. An air-fuel ratio sensor 41 is located in the exhaust manifold 24. The air-fuel ratio sensor 41 generates voltage proportional to the air-fuel ratio and outputs the voltage to the ECU 30.

The ECU 30 obtains the distance traveled by the vehicle based on data from an odometer 32.

The ECU 30 optimally controls the fuel injectors 11, the motors 19, 22 and the EGR valve 29 based on the above described sensors.

Figure 6:
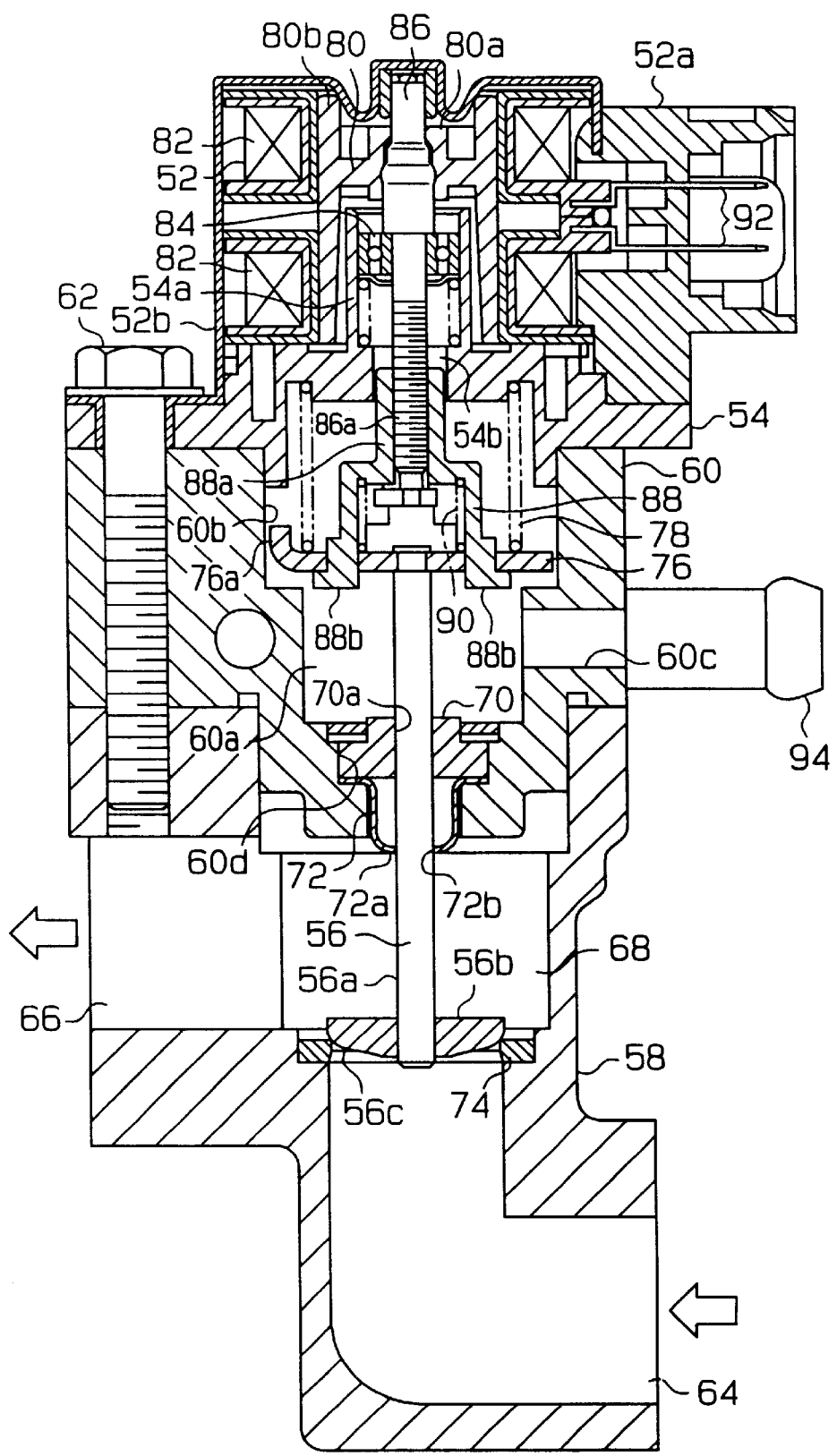
FIG. 6 is a cross-sectional view showing an EGR valve located in the engine of FIG. 1.

The structure of the EGR valve 29 will now be described with reference to FIG. 6. The EGR valve 29 is an electrically controlled valve for adjusting fluid flow. The housing of the valve 29 includes an upper housing part 54, a lower housing part 58 and a middle housing part 60 located between the upper and lower housing parts 54, 58. A stepping motor 52 is attached to the upper housing part 54 by a plate 52*b*. The stepping motor 52 has a connector 52*a*. The connector 52*a* has terminals 92. The housing parts 54, 58, 60 and the plate 52*b* are fastened together by a bolt 62.

The lower housing part 58 has an inlet 64 and an outlet 66. The inlet 64 is connected to the upstream portion of the EGR passage 29*a* and the outlet 66 is connected to the downstream portion of the EGR passage 29*a*. The inlet 64 and the outlet 66 are connected by a valve body chamber 68 defined in the lower housing part 58. The valve body chamber 68 accommodates a valve body 56. The valve body 56 is moved axially. The valve body 56 is a poppet valve that opens inward and includes a valve shaft 56*a* and a valve seal 56*b*. The valve seal 56*b* is secured to the lower end of the valve shaft 56*a*. The valve seal 56*b* has a tapered face 56*c* formed on the lower side.

A through hole 60*d* is formed in the middle housing part 60. A seal member 70 and a stopper 72 are fitted in the through hole 60*d*. The valve shaft 56*a* extends through a hole 70*a* formed in the seal member 70 and a hole 72*b* formed in the stopper 72. A narrow clearance exists between the shaft 56*a* and the holes 70*a*, 72*b*. An annular valve seat 74 is attached to the lower housing part 58 between the inlet 64 and the valve body chamber 68. As the valve shaft 56*a* is moved axially, the valve face 56*c* of the valve seal 56*b* is brought closer to and away from the valve seat 74.

A spring chamber 60*a* is defined in the middle housing part 60. The valve shaft 56*a* extends from the lower housing part 58 into the spring chamber 60*a*. A circular disk seat 76 is secured to the upper end of the valve shaft 56*a*. A valve spring 78 is located between the spring seat 76 and the lower face of the upper housing part 54. The spring 78 urges the valve body 56 downward, or in a direction towards the valve seat 74. A projection 76*a* is formed at the periphery of the spring seat 76. A groove 60*b* is formed in the inner wall of the spring chamber 60*a*. The groove 60*b* extends in the direction of the axis of the shaft 56*a*. The projection 76*a* is engaged with and guided by the groove 60*b*, which prevents the spring seat 76 and the valve shaft 56 from rotating.

The stepping motor 52 includes a rotor 80 and upper and lower stators 82. The axis of the rotor 80 is aligned with the axis of the valve shaft 56*a*. The stators 82 are located about the rotor 80. The rotor 80 has a cylindrical holder 80*a* and a cylindrical permanent magnet 80*b* located about the holder 80*a*. The permanent magnet 80*b* includes north poles and south poles, which are alternately arranged in the circumferential direction. A rotor shaft 86 is fitted in the holder 80*a*. The rotor 80 rotates integrally with the rotor shaft 86. A support cylinder 54*a* extends upward from the upper housing part 54 to surround the rotor shaft 86. The rotor shaft 86 is rotatably supported on the support cylinder 54*a* by a bearing 84.

An external thread 86*a* is formed on the distal end of the rotor shaft 86. The external thread 86*a* extends through the support cylinder 54*a*, a hole 54*b* in the upper housing part 54 and the spring chamber 60*a* of the middle housing part 60.

A substantially cylindrical valve mover 88 is threaded to the external thread 86*a*. The valve mover 88 includes an internal thread portion 88*a*. The internal thread portion is threaded to the external thread 86*a* of the shaft 86 and is inserted into the hole 54*b* of the upper housing part 54. The valve mover 88 also includes a leg portion 88*b* coupled to the spring seat 76. The spring seat 76 does not rotate relative to the valve mover 88 but can move axially relative to the valve mover 88.

A spring 90 is located between the spring seat 76 and the valve mover 88. The spring 90 urges the spring seat 76 away from the valve mover 88 thereby determining the axial position of the valve seat 76 relative to the valve mover 88. Rotation of the rotor shaft 86 causes the valve mover 88, the spring seat 76 and the valve body 56 to integrally move in the axial direction. If a foreign object is caught between the valve seal 56*b* and the valve seat 74 when the valve seal 56*b* is moving toward the valve seat 74, the spring 90 contracts to allow the valve 56 and the spring seat 76 to axially move relative to the valve mover 88. This prevents the stepping motor 52 from receiving undue force caused by the foreign object, which improves the durability of the stepping motor 52.

Each stator 82 includes, for example, three sets of wires and is connected to the terminals 92 in the connector 52*a*. When receiving a pulse signal from the ECU 30 through the terminals 92, the stepping motor 52 rotates in one direction or the other in accordance with the applied pulse. Accordingly, the valve body 56 is axially moved by the rotor shaft 86 and the valve mover 88, which adjust the opening of the valve body 56.

The stopper 72 is substantially cup-shaped. When contacting the valve seal 56*b*, the stopper 72 defines the upper limit position, or the maximum opening, of the valve seal 56*b*. Also, the stopper 72 removes foreign matter on the surface of the valve shaft 56*a* thereby preventing foreign matter from reaching the seal member 70 and the spring chamber 60*a*. The stopper 72 is made of a heat resistant material, such as stainless steel. The lower end 72*a* of the stopper 72 faces the valve seal 56*b*. A hole 72*b* is formed in the lower end 72*a*. The diameter of the hole 72*b* is slightly larger than that of the valve shaft 56*a*. When the valve shaft 56*a* is moved axially, the inner surface of the hole 72*b* removes foreign matter such as deposits from the surface of the valve shaft 56*a*.

Two nipples 94 protrude from the middle housing part 60. In FIG. 6, the nipples 94 lie in the same plane and therefore only one is visible. Each nipple 94 is connected to the spring chamber 60*a* by a coolant passage 60*c*. The nipples 94 conduct coolant into and out of the spring chamber 60*a*, which cools the middle housing part 60 and the valve body 56. The coolant prevents the stepping motor 52 from being adversely affected by high temperature exhaust gas.

Next, combustion control performed by the ECU 30 will be described. The ECU 30 selects one of four combustion modes R1, R2, R3 and R4 based on the engine speed NE and a lean burn injection amount QL referring to the map of FIG. 7(A). The lean burn injection amount QL is a value for making the air-fuel ratio greater than a theoretical air-fuel ratio and is optimized for setting the output torque of the engine 1 to a target value. The lean burn injection amount QL is determined based on running characteristics of the engine 1 such as the engine speed NE and the depression degree ACCP of the pedal 25. Values QQ1, QQ2, QQ3 are threshold values of the lean burn injection amount QL at which the combustion mode is switched among R1, R2, R3 and R4. The threshold values QQ1, QQ2, QQ3 decrease as the engine speed NE increases.

Figures 7A, 7B:
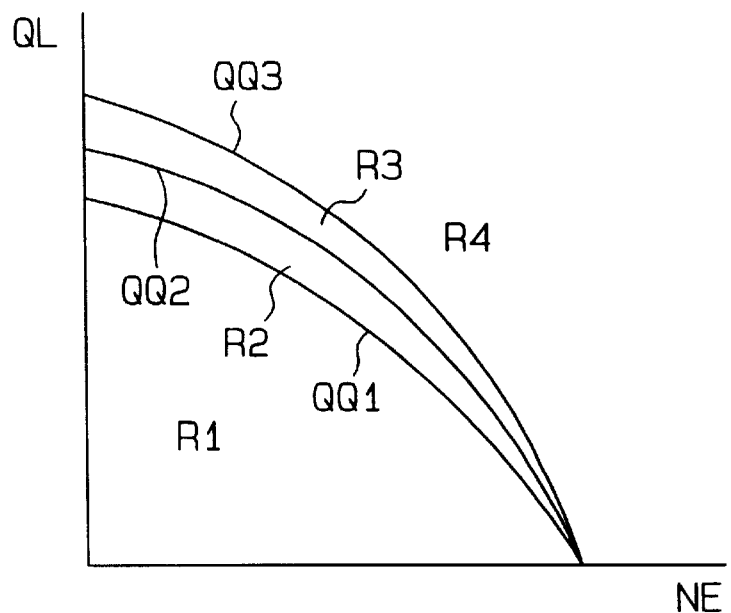
FIG. 7(A) is a graph showing a map used for selecting an injection mode.
FIG. 7(B) is a chart showing target air-fuel ratios and injection timings in various injection modes.

As shown in FIG. 7(B), when one of the first to third injection modes R1 to R3 is performed, the target air-fuel ratio is basically higher than the theoretical air-fuel ratio. In other words, the air-fuel mixture is made leaner. However, when rich-spike control is performed, the air-fuel ratio is temporarily lowered. When the fourth injection mode R4 is performed, the target air-fuel ratio is basically set to the theoretical air-fuel ratio. However, the air-fuel ratio can be lower than the theoretical air-fuel ratio depending on the running state of the engine. When the first injection mode R1 is performed, fuel is injected at the end of the compression stroke of the piston 3. When the second injection mode R2 is performed, fuel is injected twice, once during the intake stroke and once at the end of the compression stroke. When the third injection mode R3 or the fourth injection mode R4 is performed, fuel is injected during the intake stroke of the piston 3.

Figure 8:
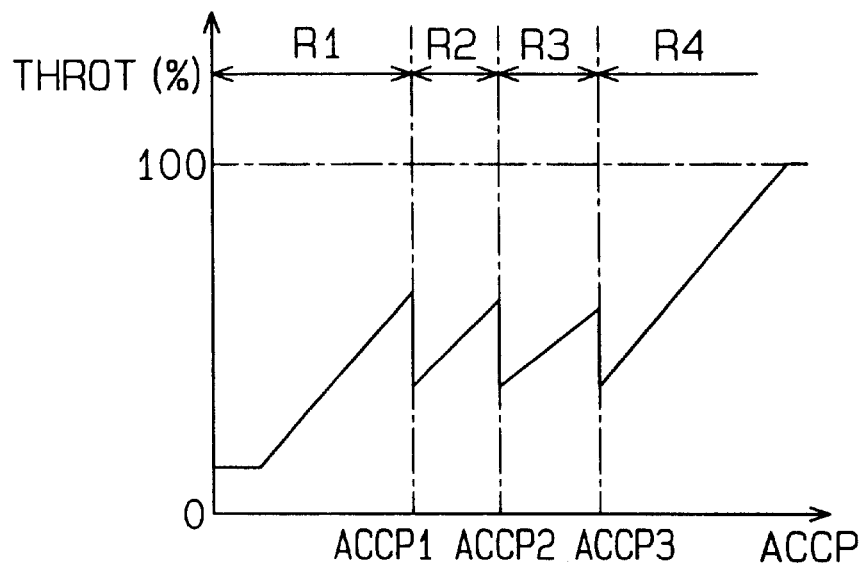
FIG. 8 is a graph showing the relationship between the depression amount of a gas pedal and the opening amount of a throttle valve.

FIG. 8 is a graph showing the relationship between the depression degree ACCP of the gas pedal 25 and the opening amount THROT of the throttle valve 23. Threshold values ACCP1, ACCP2, ACCP3 of the depression degree ACCP are values at which the injection mode is switched among the injection modes R1 to R4. In each injection mode R1 to R4, the opening amount THROT of the throttle valve 23 increases as the depression degree ACCP increases.

When the first to third injection modes R1 to R3 are performed, the opening amount of the SCV 17 is decreased. Further, the target air-fuel ratio is the high air-fuel ratio in the first to third injection modes R1 to R3. Therefore, in the first to third injection modes R1 to R3, a swirl S is generated in the combustion chamber 5 (see FIG. 2).

Figure 9:
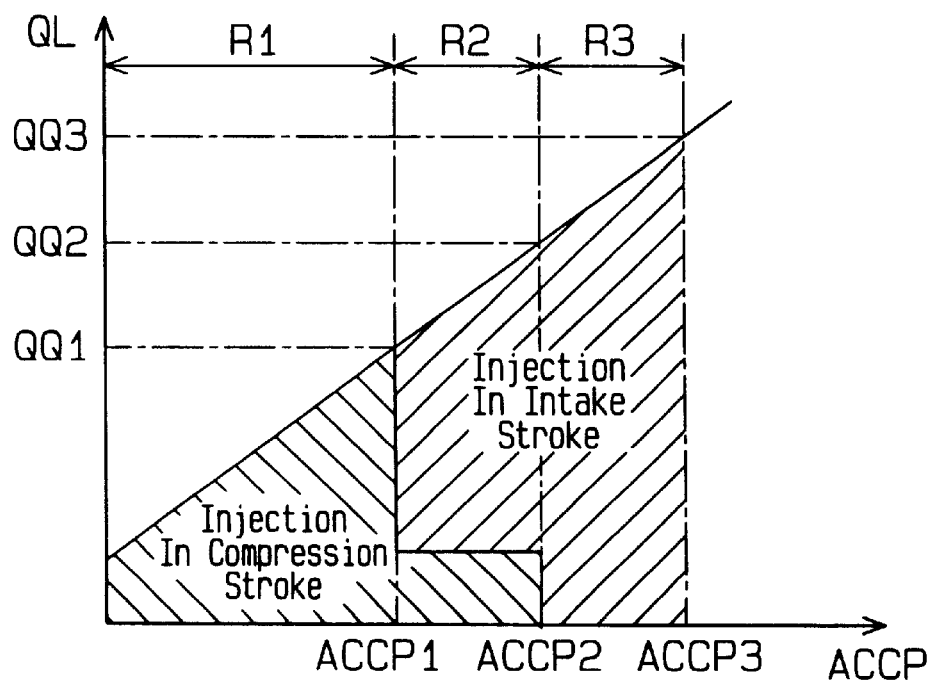
FIG. 9 is a graph shown the relationship between the depression amount of a gas pedal and the amount of fuel injection.
Figure 10:
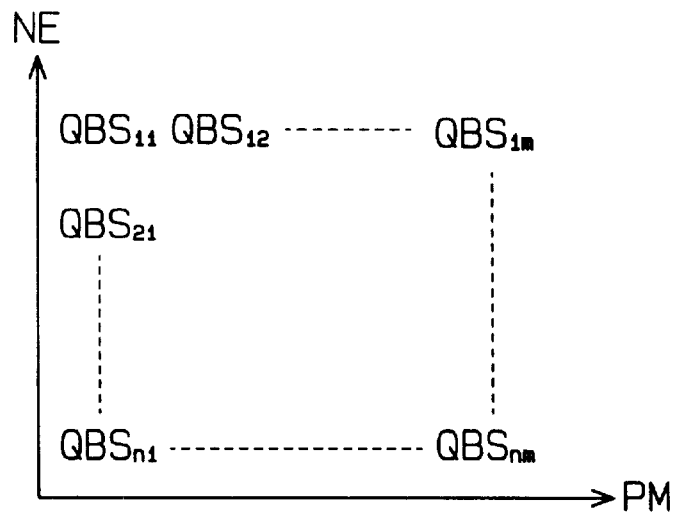
FIG. 10 is a graph showing a map used for determining a basic injection amount.

FIG. 9 is a graph showing the relationship between the depression degree ACCP of the gas pedal 25 and the fuel injection amount when the first to third injection modes R1 to R3 are performed. When the lean burn injection amount QL is smaller than the threshold value QQ1, fuel is injected at the end of the compression stroke. In other words, when the first injection mode R1, in which the depression amount ACCP is smaller than the threshold value ACCP1, fuel is injected at the end of the compression stroke. At this time, the injection amount is increased as the depression amount ACCP increases. The injected fuel hits the wall of the bowl 13 (see FIGS. 3 and 4). The fuel is then gasified and diffused by the swirl S, which produces air-fuel mixture in the recess 14 and the bowl 13. At this time, the combustion chamber 5 except for the recess 14 and the bowl 13 is filled with air. The mixture is ignited by the spark plug 10. In this manner, the fuel is injected at the compression stroke and stratified charge combustion is performed in the first injection mode R1.

When the lean burn fuel injection amount QL is between the threshold value QQ1 and the threshold value QQ2, fuel is injected twice. In other words, while the second injection mode R2 is performed (when the depression amount ACCP is between the threshold value ACCP1 and the threshold value ACCP2) fuel is injected twice, once during the intake stroke and once during the compression stroke. Fuel injected during the intake stroke is mixed with air flowing into the combustion chamber 5 and forms a uniform, lean air-fuel mixture. At the end of the compression stroke, fuel is injected toward the bowl 13 and the dish 12, which produces an air fuel mixture having a combustible air-fuel ratio in the recess 14 and the bowl 13. This air-fuel mixture is ignited by the spark plug and triggers combustion of the lean mixture in the entire combustion chamber 5. In this manner, fuel is injected during the intake stroke and during the compression stroke in the second injection mode R2. The combustion of the second injection mode R2 is referred to as semi-stratified charge combustion, which is between the stratified and homogeneous charge combustion.

When the second injection mode R2 is performed, less fuel is injected than in the third injection mode R3, and fuel injected in the intake stroke forms a fairly lean mixture in the entire combustion chamber 5. However, the opening amount of the SCVs 17 remains small during the second injection mode R2, which forms a strong swirl in the combustion chamber 5. The swirl quickly transfers the ignited flame to the entire lean mixture, which enables satisfactory combustion despite the lean mixture. The amount of fuel injected at the end of the compression stroke is sufficient if the fuel functions as a combustion trigger. Therefore, as shown in FIG. 9, the amount of fuel injected in the compression stroke is constant regardless of the depression amount ACCP of the gas pedal 25. On the other hand, the amount of fuel injected during the intake stroke increases as the depression amount ACCP increases.

When the lean burn injection amount QL is between the threshold value QQ2 and the threshold value QQ3, fuel is injected during the intake stroke. That is, while the third injection mode R3 is performed (when the depression amount ACCP is between the threshold value ACCP2 and the threshold value ACCP3) fuel is injected during the intake stroke. The injected fuel is mixed with air flowing into the combustion chamber 5 and forms a combustible homogenous air-fuel mixture in the entire combustion chamber 5. The air-fuel mixture is ignited and burned by the spark plug 10. In this manner, during the third injection mode R3, fuel is injected in the intake stroke, and homogenous combustion, or homogenous lean combustion, is performed. The injection amount of fuel is increased as the depression amount of the gas pedal 25 is increased.

When the lean burn fuel injection amount QL is greater than the threshold value QQ3, fuel is injected during the intake stroke. That is, during the fourth injection mode R4, in which the depression amount ACCP is greater than the threshold value ACCP3, fuel is injected in the suction stroke as in the third injection mode R3. This forms a homogeneous air-fuel mixture having a theoretical air-fuel ratio in the combustion chamber 5. Igniting the homogeneous air-fuel mixture starts homogeneous combustion, or homogeneous stoichiometric combustion. The fuel injection amount in the homogeneous stoichiometric combustion is different from the lean burn injection amount. The ECU 30 calculates the fuel injection amount of the homogeneous stoichiometric combustion based on a basic fuel injection amount QBS and a correction factor FAF. The basic injection amount QBS is determined based on the intake pressure PM in the surge tank 16 and the engine speed NE referring to the map of FIG. 10. The correction factor FAF is determined based on the signals from the air-fuel ratio sensor 41 and is used for matching the air-fuel ratio with the theoretical air-fuel ratio. While the fourth combustion mode R4 is performed, the throttle opening THROT is increased as the depression amount ACCP is increased as illustrated in FIG. 8.

In this manner, during the fourth injection mode R4, the fuel injection is controlled based on an injection amount that is calculated differently than the lean burn injection amount QL. However, the injection mode must be determined based on the lean burn injection amount QL. Therefore, even while the fourth injection mode R4 is performed, the calculation of the lean burn injection amount QL is continued.

Figure 11:
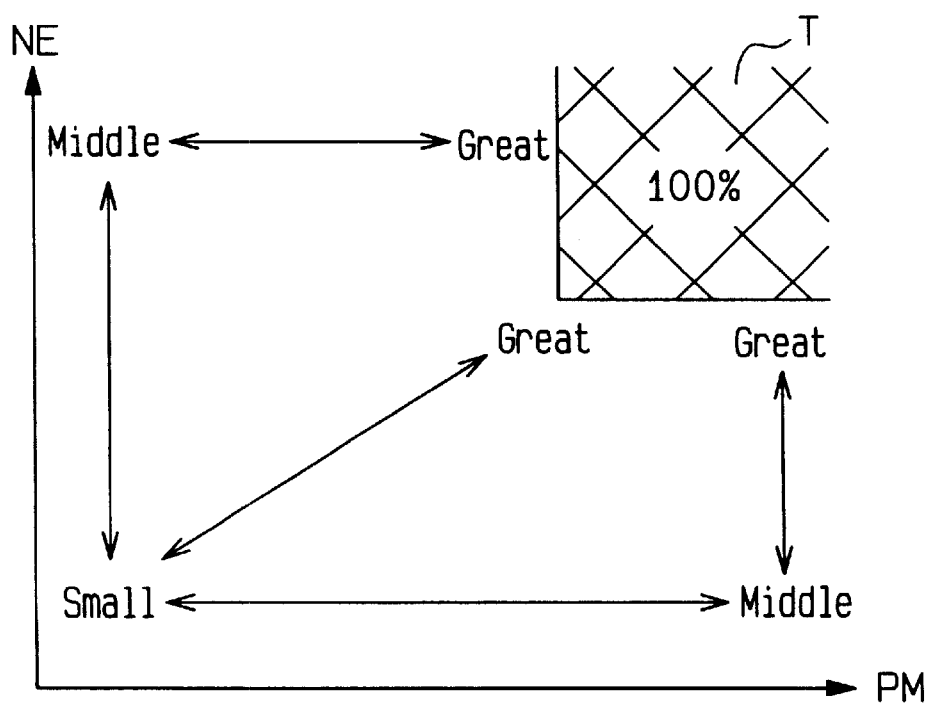
FIG. 11 is a graph showing a map used for determining a target opening amount of an SCV.

FIG. 11 shows a map for determining a target opening amount OP of the SCV 17 when the fourth injection mode R4 is performed. The target opening amount OP of the SCV 17 increases as the intake pressure PM, which represents the load applied to the engine, increases. The target opening amount OP also increases as the engine speed NE increases. In a region T, where the intake pressure PM and the engine speed NE are relatively great, the target opening OP is 100%. In other words, when the engine load is great and the engine speed NE is high, the SCV 17 is fully opened. Therefore, the engine draws in a significant amount of air when the speed and the load are great, which decreases pumping loss. In this manner, the SCV 17 also controls the intake amount.

Figure 12:
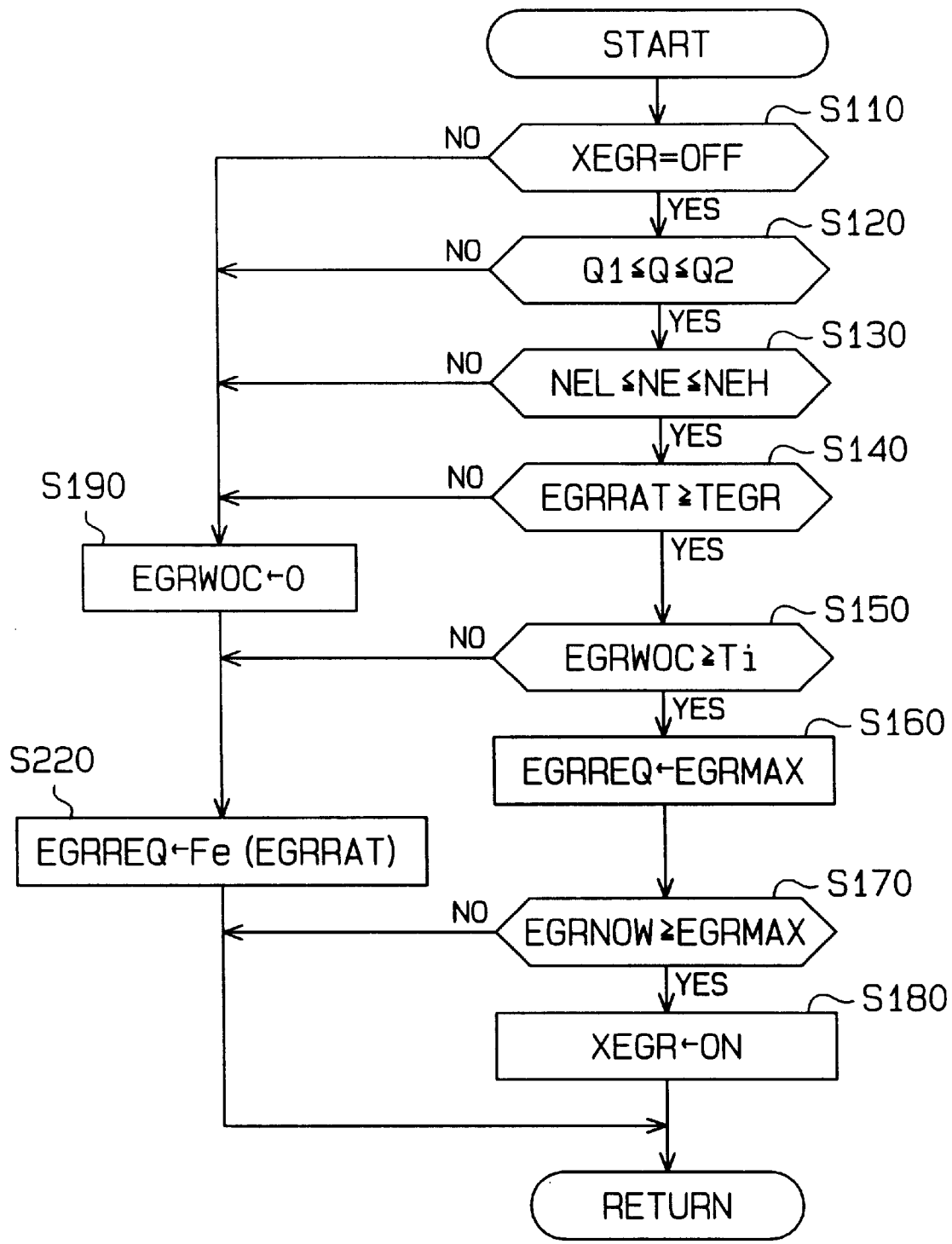
FIG. 12 is a flowchart showing a routine for fully opening an EGR valve, or a forced full open routine, according to a first embodiment.
Figure 13:
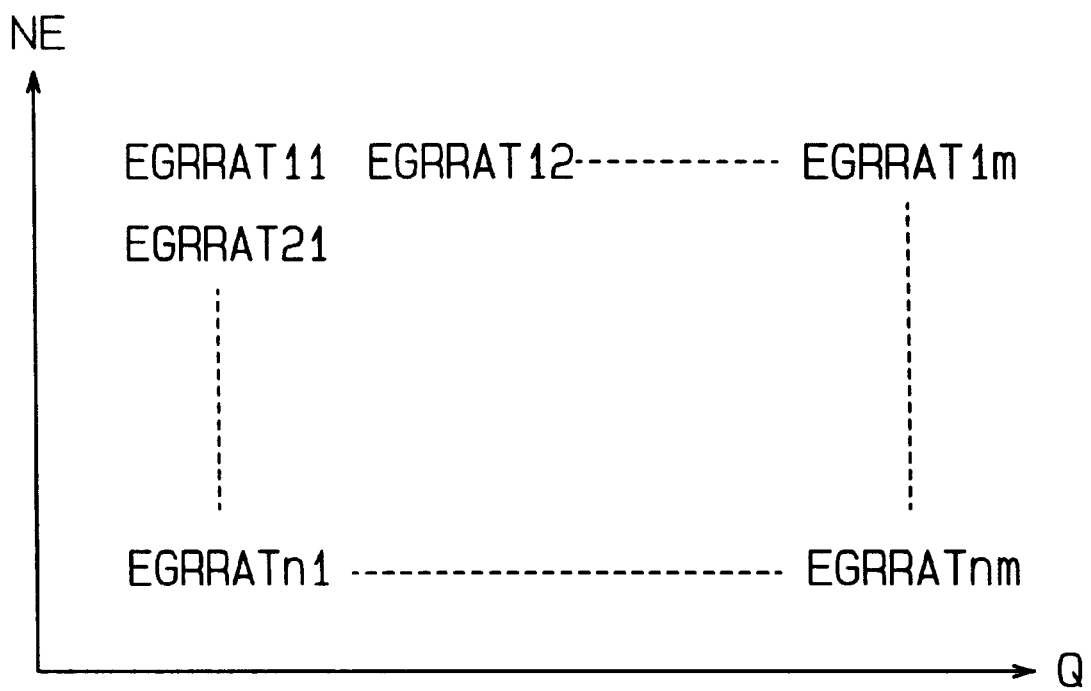
FIG. 13 is a graph showing a map used for calculating the opening amount of an EGR valve.

A process for forcefully opening the EGR valve will now be described. This process is performed by the ECU 30. FIG. 12 is a flowchart showing this process. The routine of FIG. 12 is executed in an interrupting manner at predetermined intervals.

When entering the routine, the ECU 30 judges whether a full open flag XEGR is set to OFF at step S110. The full open flag XEGR is set to OFF when the ignition switch (not shown) is turned on to start the engine 1 or when the ECU 30 is turned on. The full open flag XEGR is set to ON when the EGR valve 29 is fully opened for the first time in one trip of the engine 1. One trip refers to a period from when the engine 1 is started to when the engine 1 is stopped. Once set to ON, the flag XEGR is kept at ON until the engine 1 is stopped regardless of the opening amount of the EGR valve 29.

If the full open flag XEGR is OFF at step S110, that is, if the EGR valve 29 has not been fully opened in one trip of the engine 1, the ECU 30 moves to step S120. At step S120, the ECU 30 judges whether the current injection amount Q from the fuel injector 11 is between the lowest value Q1 and the highest value Q2. The fuel injection amount Q represents the load applied to the engine 1. The EGR valve 29 can be fully opened when the injection amount Q is in the range between the lowest and the highest values Q1 and Q2. In other words, in the range between the values Q1 and Q2, relatively great fluctuations of the exhaust recirculation ratio (EGR ratio) do not adversely affect the running state of the engine 1. The EGR ratio refers to the ratio of the amount of recirculated exhaust gas to the amount of intake air.

If the current injection amount Q is between the lowest value Q1 and the highest value Q2, the ECU 30 moves to step S130. At step S130, the ECU 30 judges whether the engine speed NE is between a lowest value NEL and a highest value NEH. In the range between the lowest and the highest values NEL and NEH, the EGR valve 29 can be fully opened. In other words, in the range between the values NEL and NEH, relatively great fluctuations of the exhaust recirculation ratio (EGR ratio) do not adversely affect the running state of the engine 1.

If the current engine speed NE is between the values NEL and NEH, the ECU 30 moves to step S140. At step S140, the ECU 30 judges whether a basic target opening amount EGRRAT of the EGR valve 29 is equal to or smaller than a reference value TEGR. The basic target opening amount EGRRAT of the valve 29 is calculated based on the running state of the engine 1. Specifically, the basic target valve opening amount EGRRAT is calculated based on the injection amount Q and the engine speed NE referring to a map of FIG. 13. The reference value TEGR is smaller than the maximum open amount of the EGR valve 29. If the opening amount the EGR valve 29 changes between the reference value TEGR and the maximum open amount, the EGR ratio is not significantly changed. In this case, the fluctuations of the EGR ratio are in an acceptable range.

If the basic target opening amount EGRRAT is equal to or greater than the reference value TEGR, the ECU 30 moves to step S150. At step S150, the ECU 30 judges whether a count value EGRWOC has reached a reference value Ti. The count value EGRWOC represents a time measured by a timer counter in the CPU of the ECU 30. The count value EGRWOC is continuously incremented as long as the ECU 30 is turned on.

If any one of the steps S110 to S140 is judged to be NO, the ECU 30 moves to step S190 and resets the count value EGRWOC to zero. After step S190, the ECU 30 moves to step S220. If the count value EGRWOC is smaller than the reference value Ti in step S150, the ECU 30 moves to step S220. In other words, even if steps S110 to S140 are all satisfied, the ECU 30 moves to step S220 unless this condition has lasted for a period represented by the reference value Ti.

At step S220, the ECU 30 corrects the calculated basic target opening amount EGRRAT in accordance with a function Fe for obtaining a target opening amount EGRREQ of the EGR valve 29. Thereafter, the ECU 30 temporarily suspends the processing. The ECU 30 controls the stepping motor 52 such that the EGR valve 29 is opened to the target opening amount EGRREQ. As a result, the opening of the EGR valve 29 is adjusted in accordance the running state of the engine 1.

If the count value EGRWOC is equal to or greater than the reference value Ti in step S150, the ECU 30 moves to step S160. In other words, if all the steps S110 to S140 have been satisfied for a period represented by the reference value Ti, the ECU 30 moves to step S160. At step S160, the ECU 30 sets a maximum opening amount EGRMAX as the target opening amount EGRREQ of the EGR 29. As a result, the ECU 30 controls the stepping motor 52 to fully open the EGR valve 29 regardless of the value of the basic target opening amount EGRRAT determined based on the map of FIG. 13.

At a subsequent step S170, the ECU 30 judges whether the current opening amount EGRNOW of the EGR valve 29 is equal to or greater than the maximum opening amount EGRMAX. If the current opening amount EGRNOW is smaller than the maximum opening amount EGRMAX,, the ECU 30 judges that the EGR valve 29 is currently moving to the maximum open position and temporarily suspends the processing. If the current opening amount EGRNOW is equal to or greater than the maximum opening amount EGRMAX, the ECU 30 judges that the full opening of the EGR valve 29 is completed and moves to step S180. At step 180, the ECU 30 sets the full open flag XEGR to ON and temporarily suspends the processing.

The full open flag XEGR remains ON as long as the engine 1 continues running. Thus, the determination of step S110 is always NO when the engine 1 is running. Therefore, once the EGR valve 29 is fully opened in one trip of the engine 1, only steps S190, S220 are repeated, and the opening amount of the EGR valve 29 is controlled in accordance with the running state of the engine 1.

The embodiment of FIGS. 1 to 13 has the following advantages.

Whether fully opening the EGR valve 29 adversely affects the combustion of the engine 1 is judged based on the determinations of steps S120 to S140. Particularly, at step S140, whether the basic target opening amount EGRRAT is equal to or greater than the reference value TEGR is judged. Based on the determination of step S140, the ECU 30 judges whether fluctuations of the EGR ratio will be in an acceptable range if the EGR valve 29 is moved to the fully open position. If the determinations of steps S120 to S140 are all YES, that is, if the ECU 30 judges that the combustion of the engine 1 will not be hindered and, if this condition lasts for the predetermined period, the EGR valve 29 is forced fully open. Specifically, the valve shaft 56a is lifted until the valve seal 56b contacts the lower end 72a of the stopper 72. The inner surface of the hole 72b in the stopper 72 removes deposits from the valve shaft 56a. Further, removal of the deposits does not hinder the running state of the engine 1.

The EGR valve 29 is fully opened when the engine 1 is running. Therefore, unlike the prior art, in which the EGR valve is fully opened when the engine is stopped, the embodiment of FIGS. 1 to 13 does not deteriorate the starting conditions of the engine 1.

In one trip of the engine 1, once forced fully open, the EGR valve 29 will not be forced fully open again. This prevents the EGR valve 29 from being frequently fully opened, which minimizes combustion fluctuations caused by fully opening the EGR valve 29.

A process for forcing open the EGR valve 29 according to a second embodiment will now be described referring to a flowchart of FIG. 14. The same reference numerals are given to those steps that are the same as the corresponding steps in the flowchart of FIG. 12. The embodiment of FIG. 14 is different from the embodiment of FIG. 12 in that step S135 is added between step S130 and step S140.

At step S135, the ECU 30 judges whether the injection mode is one of the first injection mode R1 and the second injection mode R2. In other words, the ECU 30 judges whether fuel is injected in the compression stroke of the piston 3. If the determination is YES, the ECU 30 moves to step S140. If the determination is NO, the ECU 30 moves to step S190.

As described above referring to FIGS. 8 and 9, when the first injection mode R1 or the second injection mode 2 is selected, lean burning is performed, and the throttle opening amount THROT is relatively great for the injection amount. Fuel is therefore injected in the compression stroke to improve the combustibility and stratified combustion is performed.

Figure 14:
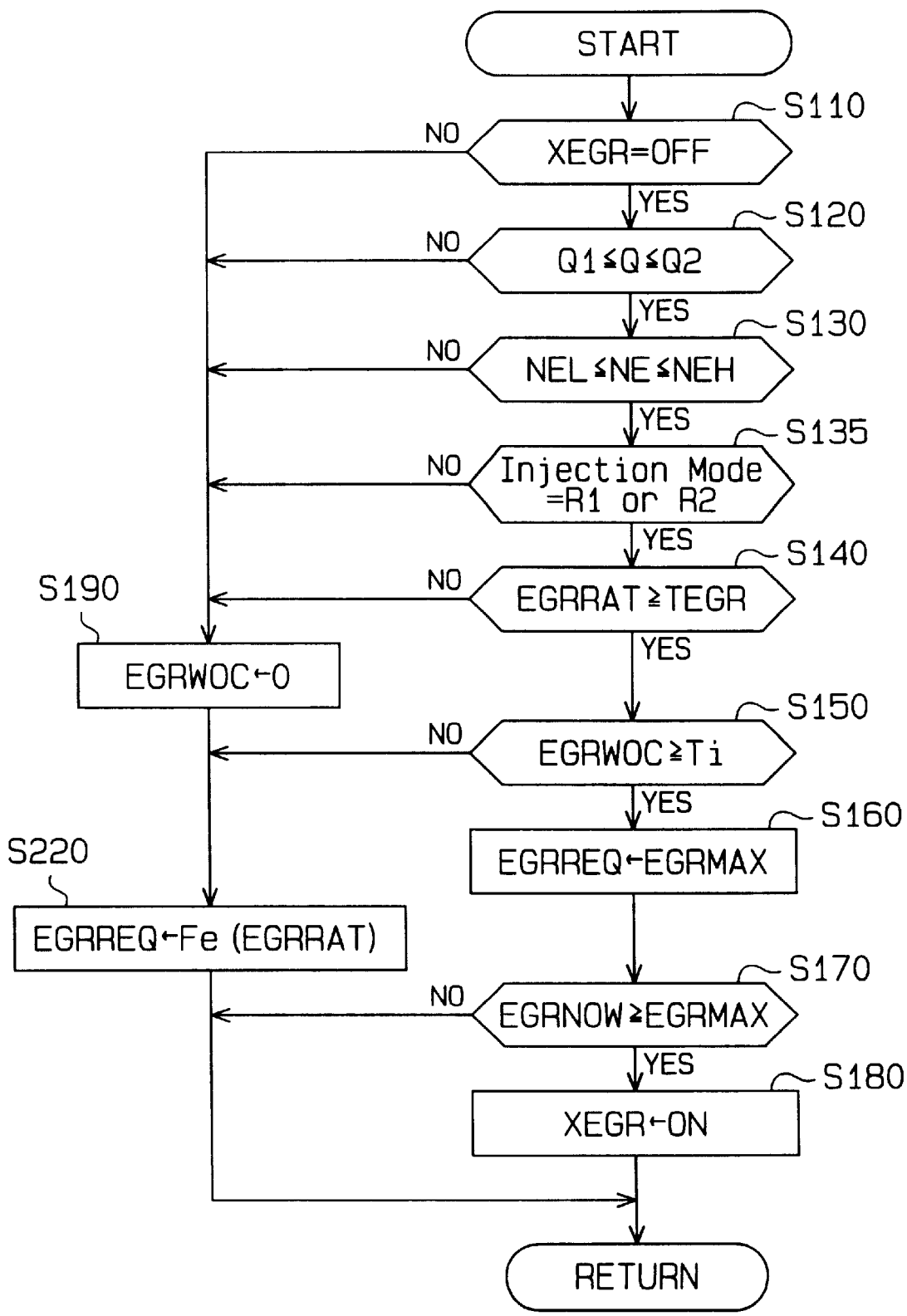
FIG. 14 is a flowchart showing a forced full open routine according to a second embodiment.

In the embodiment of FIG. 14, the EGR valve 29 is fully opened when the step S135, in addition to steps S110, S120, S130, S140, is satisfied. That is, the EGR valve 29 is fully opened only when stratified charge combustion, in which fuel is injected in the compression stroke, is performed. In stratified charge combustion, the amount of intake air is relatively great, which suppresses the fluctuations of the EGR ratio due to changes of the opening amount of the EGR valve 29. Therefore, compared to the embodiment of FIG. 12, the embodiment of FIG. 14 effectively prevents the combustion from being affected by fully opening the EGR valve 29.

In some cases, the determinations of steps S120 and S130 based on the injection amount Q and the engine speed NE do not accurately represent the running state of the engine 1 due to hysteresis. However, in the embodiment of FIG. 14, step S135 is added. That is, whether fuel is injected in the compression stroke is used as one of the conditions for fully opening the EGR valve 29, which optimizes the process.

Figure 15:
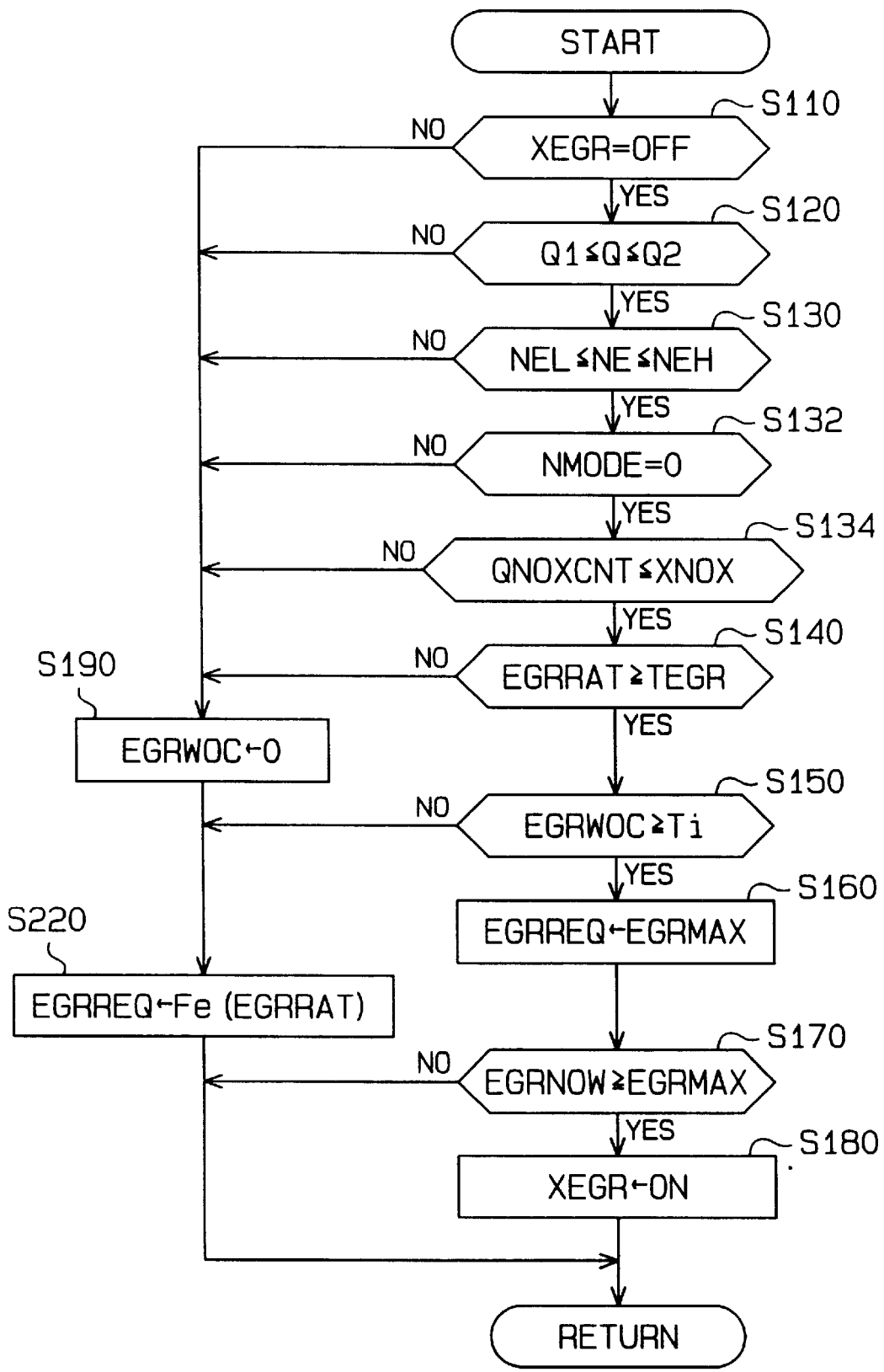
FIG. 15 is a flowchart showing a forced full open routine according to a third embodiment.

A process for forcing the EGR valve 29 open according to a third embodiment will now be described referring to a flowchart of FIG. 15. The same reference numerals are given to those steps that are the same as the corresponding steps in the flowchart of FIG. 12. The embodiment of FIG. 15 is different from the embodiment of FIG. 12 in that steps S132 and S134 are added between step S130 and step S140.

At step S132, the ECU 30 judges whether a mode value NMODE is zero. The mode value NMODE is set to zero when an injection mode for performing stratified injection (the first injection mode R1 or the second injection mode R2) is selected and rich-spike control is not performed. Rich-spike control refers to a control process for decreasing the amount of intake air to enrich the air-fuel mixture in accordance with the running state of the engine 1 (for example, how long lean burn combustion has been performed and the air-fuel ratio in the lean burn combustion). As described above, if the converter 24a is almost saturated with nitrogen oxide, rich-spike control is performed. That is, the air-fuel ratio is temporarily lowered for reducing nitrogen oxide occluded in the downstream converter 24a, which decreases the amount of adsorbed nitrogen oxide. In order to perform rich-spike control, the ECU 30 continuously calculates the amount QZNOXCNT of nitrogen oxide adsorbed in the downstream converter 24a based on how long lean burn combustion has been performed and on the air-fuel ratio in the lean burn combustion. When the computed amount QNOXCNT is equal to or greater than a predetermined acceptable value, the ECU 30 performs rich-spike control. At this time, the mode value NMODE is set to a value other than zero.

If the mode value NMODE is not zero at step S132, the ECU 30 moves to step S190 and performs a normal EGR control process in accordance with the running state of the engine 1. If the mode value NMODE is zero in step S132, the ECU 30 moves to step S134. At step S134, the ECU 30 judges whether the adsorbed amount QNOXCNT is equal to or lower than a predetermined reference value XNOX. The reference value XNOX is slightly smaller than the value for determining whether rich-spike control needs to be performed. If the adsorbed amount QNOXCNT exceeds the determination value XNOX, rich-spike control is just about to be started.

If the adsorbed amount QNOXCNT is greater than the reference value XNOX, that is, if rich-spike control is just about to be started, the ECU 30 moves to step S190. At step S190, the ECU 30 performs the normal EGR control process in accordance with the running state of the engine 1. If the adsorbed amount QNOXCNT is equal to or smaller than the determination value XNOX, that is, if there is still a relatively long time before rich-spike control is executed, the ECU 30 moves to step S140.

In the embodiment of FIG. 12, the ECU 30 fully opens the EGR valve 29 when the steps S110, S120, S130, S140 are satisfied. Further, in the embodiment of FIG. 15, the ECU 30 fully opens the EGR valve 29 when rich-spike control is not currently being performed and there is a relatively long time before rich-spike control is started.

During rich-spike control, the amount of intake air is decreased. Therefore, the EGR ratio is relatively greatly fluctuated by changes of the opening of the EGR valve 29. In the embodiment of FIG. 15, the EGR valve 29 is not fully opened when rich-spike control is performed. This suppresses fluctuations of the EGR ratio due to changes of the opening of the EGR valve 29. Thus, the embodiment of FIG. 15 further prevents the full opening the EGR valve 29 from affecting combustion.

If the control process for fully opening the EGR valve 29 is started immediately before rich-spike control is started, the process for fully opening the EGR valve 29 is sometimes not completed due to a response delay of the EGR valve 29 before rich-spike control is started. Thus, in the embodiment of FIG. 15, the control for fully opening the EGR valve 29 is prohibited not only during rich-spike control but also immediately before rich-spike control is started. Therefore, the control for fully opening the EGR valve 29 cannot affect combustion.

Figure 16:
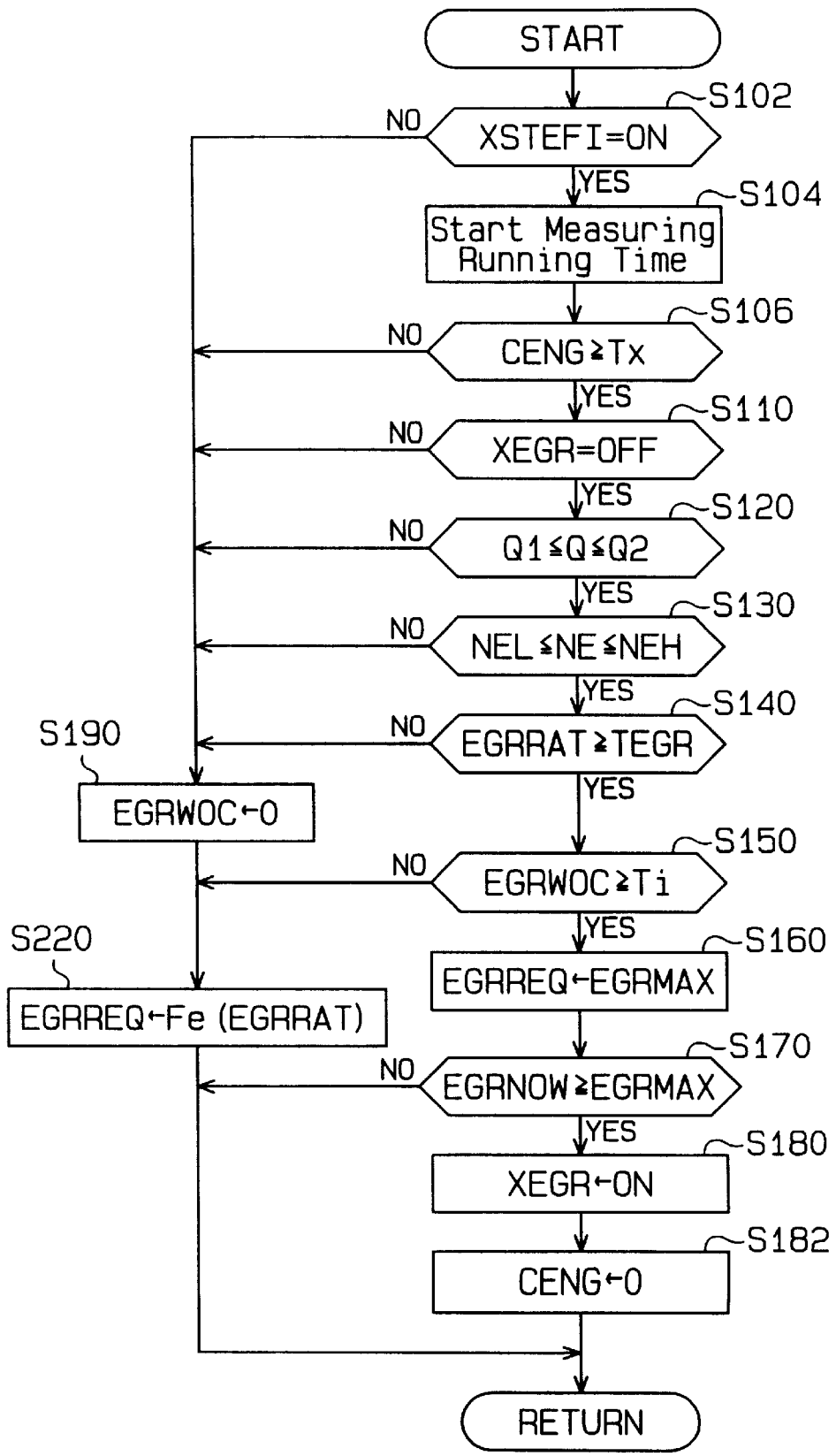
FIG. 16 is a flowchart showing a forced full open routine according to a fourth embodiment.

A control process for forcing the EGR valve 29 open according to a fourth embodiment will now be described referring to a flowchart of FIG. 16. The same reference numerals are given to those steps that are the same as the corresponding steps in the flowchart of FIG. 12. The embodiment of FIG. 16 is different from the embodiment of FIG. 12 in that steps S102, S104, S106 are added before step S110 and that step S182 is added after step S180.

At step S102, the ECU 30 judges whether an engine state flag XSTEFI is ON. If the engine state flag XSTEFI is not ON, the ECU 30 judges that the engine 1 is not running and moves to step S190. If the engine state flag XSTEFI is ON, the ECU 30 judges that the engine 1 is running and moves to step S104.

At step S104, the ECU 30 starts measuring running time of the engine 1. The measured time CENG is stored in the standby RAM in the ECU 30. The ECU 30 continues measuring the time as long as the engine 1 runs. When the engine 1 is stopped by turning off the ignition switch, the stored measured time CENG is not cleared. The measured time CENG is an accumulated value of the running time of the engine 1.

In a subsequent step S106, the ECU 30 judges whether the measured time CENG is equal to or greater than a predetermined value Tx. If the time CENG is smaller than the value Tx, the ECU 30 moves to step S190. If the time CENG is equal to or greater than the value Tx, the ECU 30 moves to step S110 and performs the same process as shown in FIG. 12.

If the full open flag XEGR is ON at step S180, the ECU 30 moves to step S182 and resets the measured time CENG to zero. Therefore, once the EGR valve 29 is fully opened, the EGR valve 27 will not be fully opened as long as the accumulated running time of the engine 1 is smaller than the predetermined value Tx.

As described in the embodiment of FIG. 12, the EGR valve 29 is fully opened once per trip of the engine 1. If there are many trips in a short period, the EGR valve 29 may be fully opened frequently. However, in the embodiment of FIG. 16, once the EGR valve 29 is fully opened, the valve 29 will not be fully opened again unless the accumulated running time of the engine 1 reaches the predetermined value Tx, which prevents the EGR valve 29 from being fully opened too frequently. In other words, the EGR valve 29 is fully opened at proper time intervals.

Figure 17:
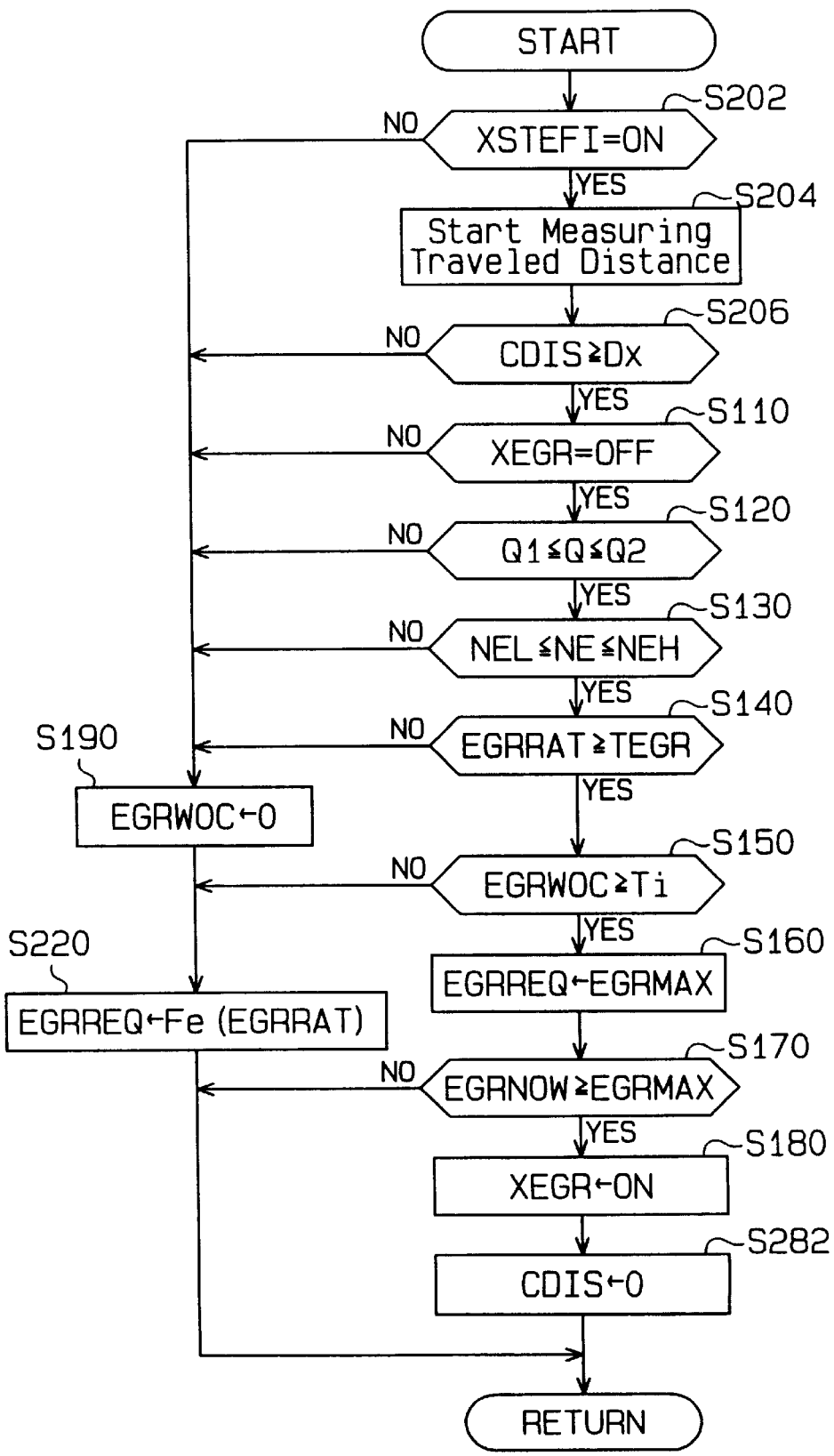
FIG. 17 is a flowchart showing a forced full open routine according to a fifth embodiment.

A control process for forcing the EGR valve 29 open according to a fifth embodiment will now be described referring to a flowchart of FIG. 17. The same reference numerals are given to those steps that are the same as the corresponding steps in the flowchart of FIG. 12. The embodiment of FIG. 17 is different from the embodiment of FIG. 12 in that steps S202, S204, S206 are added before step S110 and that step S282 is added after step S180.

At step S202, the ECU 30 judges whether the engine state flag XSTEFI is ON as in step S102 in FIG. 16. If the engine state flag XSTEFI is not ON, ECU 30 judges that the engine 1 is not running and moves to step S190. If the flag XSTEFI is ON, the ECU 30 judges that the engine 1 is running and moves to step S204.

At step S204, the ECU 30 starts measuring the traveled distance of the vehicle. The ECU 30 measures the traveled distance based on signals from the odometer 32 (see FIG. 1) and stores the measured distance CDIS in the standby RAM of the ECU 30. If the engine 1 is running, the measured distance CDIS increases as the vehicle travels. When the engine 1 is stopped by turning off the ignition switch, the measured distance CDIS is not cleared. That is, the measured distance CDIS is an accumulated value of the traveled distance of the vehicle.

In a subsequent step S206, the ECU 30 judges whether the measured distance CDIS has reached a predetermined value Dx. If the measured distance CDIS is smaller than the value Dx, the ECU 30 moves to step S190. If the measured distance CDIS is equal to or greater than the value Dx, the ECU 30 moves to step S110 and executes the same process as the embodiment of FIG. 12.

At step S180, if the full open flag XEGR is set to ON, the ECU 30 moves to step S282 and clears the CDIS to zero. Therefore, once the EGR valve 27 is fully opened, the EGR valve 27 will not be fully opened again until the accumulated traveled distance of the vehicle reaches the value Dx.

As described above, once the EGR valve 29 is fully opened, the EGR valve 29 will not be fully opened again until the accumulated distance traveled by the vehicle reaches the predetermined value Dx. Therefore, even if the trips are short and frequent, the EGR valve 29 is not frequently fully opened. In other words, the EGR valve 29 is fully opened at proper intervals.

A control process for forcing opening the EGR valve 29 open according to a sixth embodiment will now be described with reference to flowcharts of FIGS. 18 and 19. The same reference numerals are given to those steps that are the same as the corresponding steps in the flowchart of FIG. 12.

Figure 18:
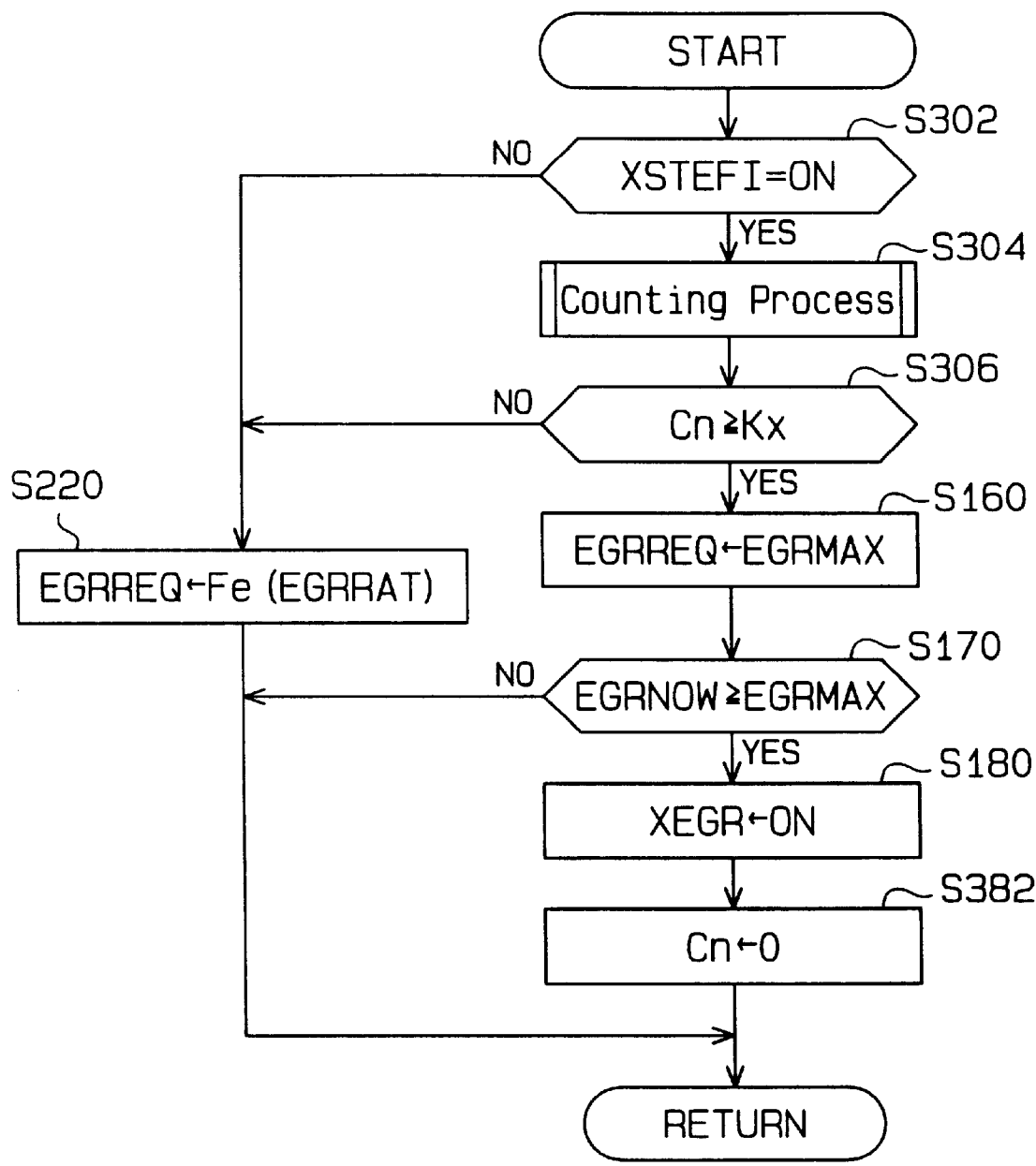
FIG. 18 is a flowchart showing a forced full open routine according to a sixth embodiment.

At step S302 of FIG. 18, the ECU 30 judges whether the engine state flag XSTEFI is ON as in step S202 of FIG. 17. If the engine state flag XSTEFI is not ON, the ECU 30 judges that the engine 1 is not running and moves to step S220. If the flag STEFI is ON, the ECU 30 judges that the engine 1 is running and moves to step S304.

Figure 19:
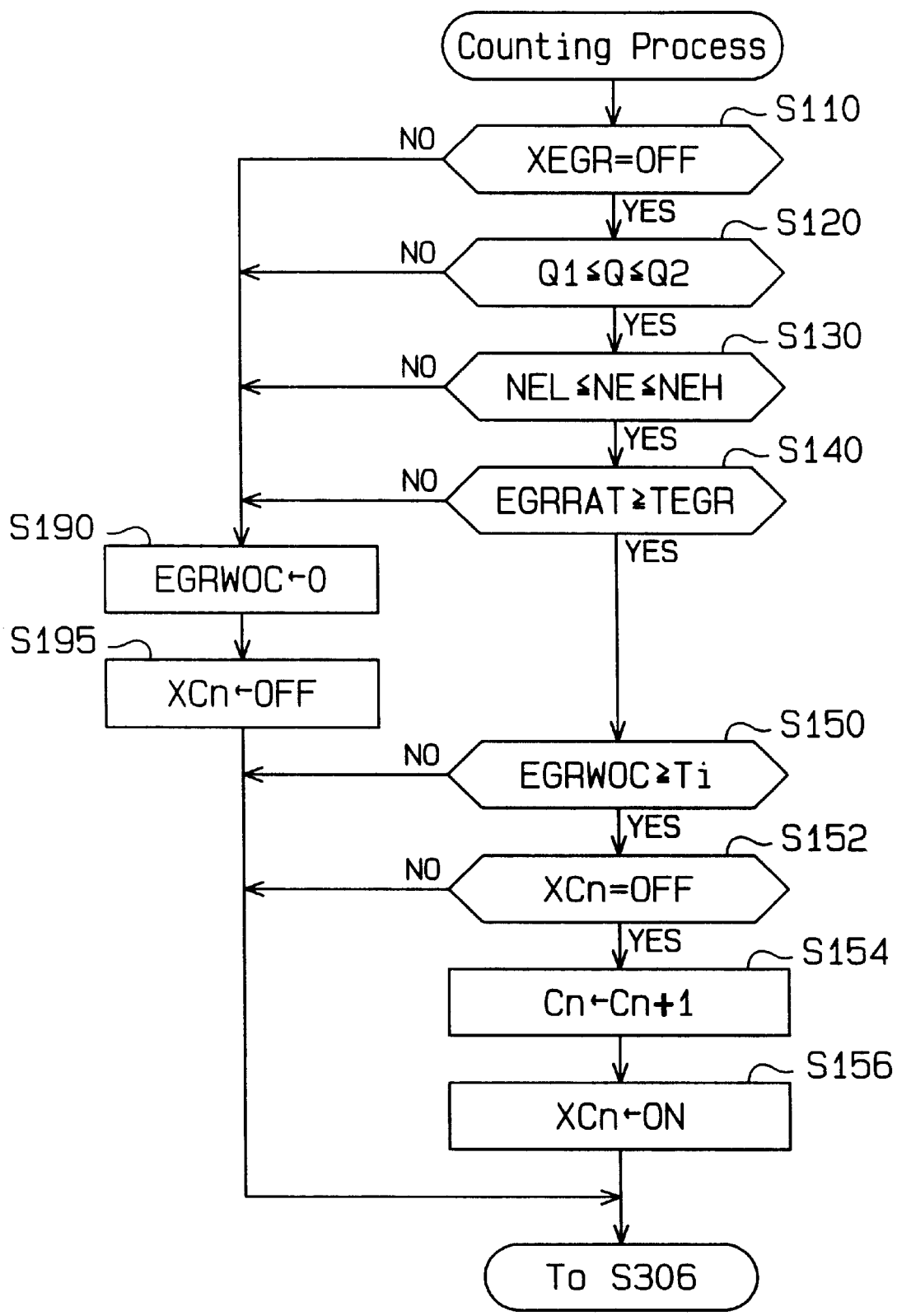
FIG. 19 is a flowchart showing a subroutine of the forced full routine of the sixth embodiment.

At step S304, the ECU 30 executes a counting process shown in the flowchart of FIG. 19. As shown in FIG. 19, the ECU 30 executes steps S110, S120, S130, S140 as in the embodiment of FIG. 12. If at least one of the steps S110, S120, S130 and S140 is not satisfied, the ECU 30 moves to step S190 and clears the count value EGRWOC to zero. In a subsequent step S195, the ECU 30 sets a condition flag XCn to OFF and moves to step S306 of FIG. 18.

If all the steps S110 to S140 are satisfied, the ECU 30 moves to step S150 and judges whether the count value EGRWOC is equal to or greater than the predetermined value Ti. If the count value EGRWOC is smaller than the value Ti, the ECU 30 moves to step S306 of FIG. 18. If the count value EGRWOC is equal to or greater than the value Ti, the ECU 30 moves to step S152. In other words, if all the steps S110 to S140 are satisfied for a period corresponding to the value Ti, the ECU 30 moves to step S152.

At step S152, the ECU 30 judges whether the condition flag XCn is OFF. If the condition flag XCn is not OFF, the ECU 30 moves to step S306 of FIG. 18. If the condition flag XCn is OFF, the ECU 30 moves to step S154 and increments a count value Cn by one. In a subsequent step S156, the ECU 30 sets the condition flag XCn to ON and moves to step S306 of FIG. 18.

When all the steps S110 to S150 are satisfied and the condition flag XCn is OFF, the count value Cn is incremented by one. Thereafter, the condition flag XCn is set to ON. As far as the steps S110 to S150 are satisfied after the count value Cn is incremented, the condition flag XCn remains in the ON state. In this state, the count value Cn is not incremented. The count value Cn will be incremented when the steps S110 to S150 are satisfied again after at least one of the steps S110 to S140 is dissatisfied and the condition flag XCn is set to OFF at step S195.

At step 306 of FIG. 18, the ECU 30 judges whether the count value Cn is equal to or greater than a predetermined value Kx. The value Kx is, for example, a natural number. When the count value Cn is smaller than the value Kx, the ECU 30 moves to step S220 and controls the opening of the EGR valve 29 in accordance with the running state of the engine 1. If the count value is equal to or greater than the value Kx, the ECU 30 executes steps S160, S170, S180. That is, as described in the embodiment of FIG. 12, the ECU 30 forces the EGR valve 29 open and then turns the full open flag XEGR to ON.

At a subsequent step S382, the ECU 30 clears the count value Cn to zero and temporarily suspends the processing.

As described above, the EGR valve 29 is fully opened only when the conditions for permitting the valve 29 to be fully opened (steps S110 to S150) are satisfied until the routine is repeated for a number of times corresponding to the value Kx. Therefore, the time interval between the operation for fully opening the valve 29 can be adjusted in accordance with the type of the engine 1. Further, the number of operations for forcefully opening the EGR valve 29 can be controlled to optimize the combustion of the engine 1.

Figure 20:
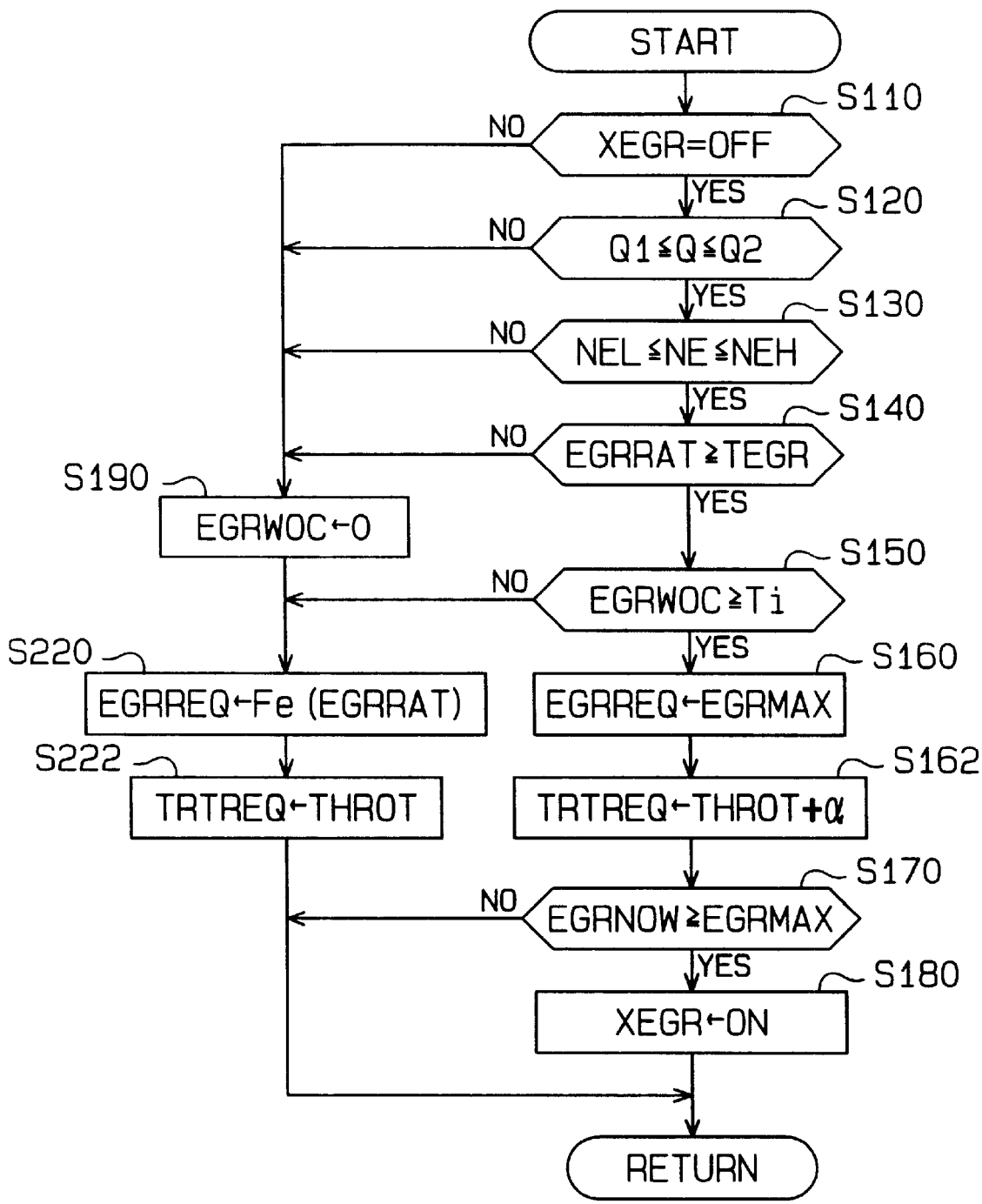
FIG. 20 is a flowchart showing a forced full open routine according to a seventh embodiment.

A control process for forcing the EGR valve 29 open according to a seventh embodiment will now be described with reference to flowcharts of FIG. 20. The same reference numerals are given to those steps that are the same as the corresponding steps in the flowchart of FIG. 12. The embodiment of FIG. 20 is different from the embodiment of FIG. 12 in that step S162 is added between step S160 and step S170, and in that step S222 is added after step S220.

At step S222, the ECU 30 obtains a throttle opening amount THROT referring to the table of FIG. 8 and sets the obtained opening amount THROT as a demanded throttle opening amount TRTREQ. On the other hand, at step S162, the ECU 30 adds a predetermined value $\alpha$ ($\alpha$>0) to the throttle opening THROT obtained from the table of FIG. 8 and sets the resultant as the demanded opening amount TRTREQ.

That is, when the EGR valve 29 is forced fully open, the throttle valve 23 is opened wider than when the EGR valve 29 is not fully opened. Since a wider opening of the throttle valve 23 increases the amount intake air, the fluctuation of the EGR ratio due to changes of the opening amount of the EGR valve 29 is decreased, which improves combustion.

Figure 21:
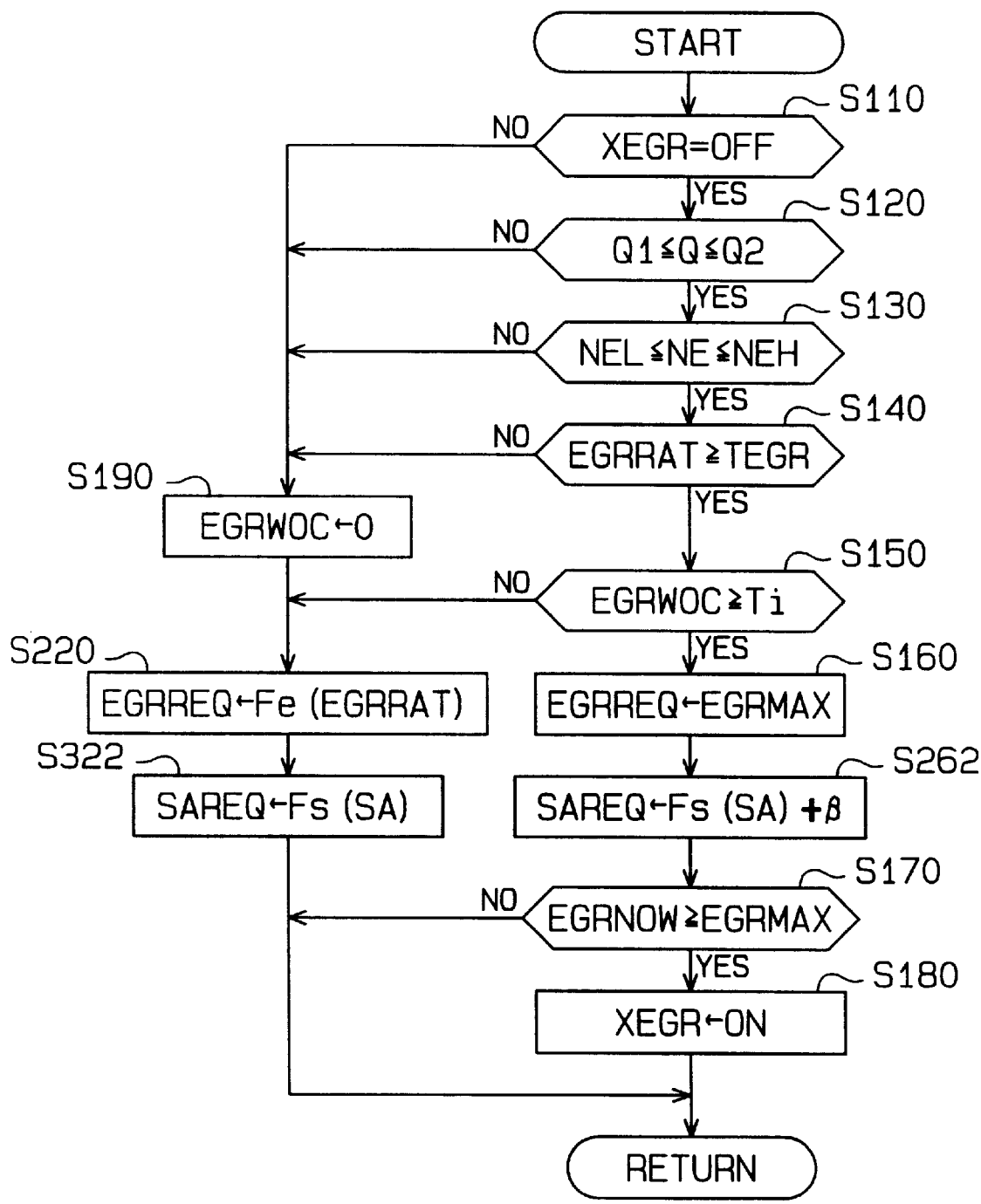
FIG. 21 is a flowchart showing a forced full open routine according to an eighth embodiment.

A control for forcefully opening the EGR valve 29 according to an eighth embodiment will now be described with reference to flowcharts of FIG. 21. The same reference numerals are given to those steps that are the same as the corresponding steps in the flowchart of FIG. 12. The embodiment of FIG. 21 is different from the embodiment of FIG. 12 in that step S262 is added between step S160 and step S170, and that step S322 is added after step S220.

The ECU 30 computes an ignition timing SA in accordance with the running state of the engine 1. At step, the ECU 30 corrects the computed ignition timing SA using a function Fs thereby obtaining a corrected timing Fs(SA). The ECU 30 sets the corrected timing Fs(SA) as a demanded ignition timing SAREQ. On the other hand, at step S262, the ECU 30 advances the timing Fs(SA) by a value $\beta$ ($\beta$>0) and sets the resultant as the demanded ignition timing SAREQ. The ignition timing corresponds to a certain rotational angle of the crankshaft (not shown), and advancing the timing by the value $\beta$ refers to advancing the ignition timing.

As described above, when the control process for forcing the EGR valve 29 open is executed, the ignition timing is advanced by the value $\beta$ compared to when the control process for forcing the EGR valve 29 open is not executed. In order to maintain a satisfactory combustion, it is preferred to advance the ignition timing as the EGR ratio increases, or as the opening amount of the EGR valve 29 increases. In the embodiment of FIG. 21, the ignition timing is advanced when the control process for forcing the EGR valve 29 open is executed, which maintains satisfactory combustion.

The present invention may be alternatively embodied in the following forms:

At step S120, the ECU 30 judges whether the injection amount Q, which represents the load applied to the engine 1, is between the lowest value Q1 and the highest value Q2. Instead of the injection amount Q, the ECU 30 may use other values that represent the engine load, such as intake amount, the opening amount of the throttle 23, the air-fuel ratio and the intake pressure and may judge whether the selected value is in a certain range.

At step S140, the ECU 30 judges whether the basic target opening amount EGRRAT computed based on the injection amount Q and the engine speed NE is equal to or greater than the predetermined reference value TEGR. However, the ECU 30 may use other values such as the current opening amount EGRNOW of the EGR valve 29 or the demanded opening amount EGRREQ and may judge whether the selected value is equal to or greater than a certain reference value.

In the embodiment of FIG. 15, the control process for forcing the EGR valve 29 open may be prohibited for a predetermined time after the rich-spike control procedure is finished.

Steps S110 and S180 may be omitted. In other words, the control process for forcing the EGR valve 29 open may be executed more than once per trip.

At least one of steps S120 and S130 may be omitted. That is, whether the injection amount Q is in the predetermined range may not be detected. Alternatively, whether the engine speed NE is in the predetermined range may not be detected.

Therefore, the present examples and embodiments are to be considered as illustrative and not restrictive and the invention is not to be limited to the details given herein, but may be modified within the scope and equivalence of the appended claims.

What is claimed is:

1. An exhaust gas recirculation mechanism for an engine, the mechanism comprising:

a combustion chamber;

an intake passage for supplying air to the combustion chamber;

an exhaust passage for discharging exhaust gas from the combustion chamber;

a recirculation passage connecting the exhaust passage with the intake passage for supplying some of exhaust gas from the exhaust passage to the intake passage;

an EGR valve located in the recirculation passage, the EGR valve serving to adjust the amount of exhaust gas recirculated to the intake passage, wherein foreign matter in exhaust gas in the recirculation passage adheres to part of the EGR valve that is exposed in the recirculation passage;

an adjuster for adjusting the opening amount of the EGR valve in accordance with the running state of the engine; and a controller for forcing the EGR valve fully open when a predetermined full open condition is satisfied while the engine is running thereby removing the foreign matter from the exposed part of the EGR valve, wherein the ratio of the amount of recirculated exhaust gas to the amount of air supplied to the combustion chamber is represented by an EGR ratio, and wherein the full open condition is a condition in which fluctuations of the EGR ratio will fall within a predetermined acceptable range if the EGR valve is fully opened.

2. The mechanism according to claim 1, wherein the controller judges that the full open condition is satisfied when the opening amount of the EGR valve, which is determined in accordance with the running state of the engine, is greater than a predetermined value.

3. The mechanism according to claim 1, wherein the full open condition requires that the load applied to the engine is within a predetermined range.

4. The mechanism according to claim 3, wherein the load applied to the engine is represented by the amount of fuel supplied to the combustion chamber, the amount of air supplied to the combustion chamber, the pressure of the intake passage, the air-fuel ratio in the combustion chamber or the opening amount of a throttle valve located in the intake passage.

5. The mechanism according to claim 1, wherein the full open condition requires that the engine speed is within a predetermined range.

6. The mechanism according to claim 1, wherein the engine performs a combustion mode selected from a plurality of combustion modes, the combustion modes comprising at least stratified charge combustion, in which the mixture is distributed in a concentrated manner in the combustion chamber, wherein the full open condition requires that stratified charge combustion is being performed.

7. The mechanism according to claim 1, wherein the engine includes an injector that directly injects fuel into the combustion chamber, wherein the full open condition requires that the injector is injecting fuel in a compression stroke.

8. The mechanism according to claim 1, wherein a catalyst is located in the exhaust passage to adsorb nitrogen oxide in the exhaust gas, wherein, when the catalyst is nearly saturated with nitrogen oxide, the engine performs rich-spike control to decrease the air-fuel ratio and reduce the nitrogen oxide, wherein the controller prohibits the operation for fully opening the EGR valve while rich-spike control is being executed.

9. The mechanism according to claim 8, wherein the controller prohibits the operation for fully opening the EGR valve for a predetermined period before execution of rich-spike control or for a predetermined period after an execution of rich-spike control.

10. The mechanism according to claim 1, wherein, if the EGR valve is forced fully open, the controller prohibits the operation for fully opening the EGR valve until a predetermined prohibition period has elapsed.

11. The mechanism according to claim 10, wherein the prohibition period is a period from when the EGR valve is forced fully open until when the engine stops.

12. The mechanism according to claim 10, wherein the prohibition period is determined by a value that accumulates during the time the engine is running.

13. The mechanism according to claim 10, wherein the prohibition period is determined by a value that represents the distance traveled by a vehicle driven by the engine.

14. The mechanism according to claim 1, wherein the controller forces the EGR valve fully open when the full open condition has been satisfied for more than a predetermined length of time.

15. The mechanism according to claim 1, further including increasing means for increasing the amount of air supplied to the combustion chamber when the EGR valve is forced fully open.

16. The mechanism according to claim 15, wherein the increasing means includes a throttle valve located in the intake passage.

17. The mechanism according to claim 1, further including means for advancing the ignition timing when the EGR valve is forced fully open.

18. An exhaust gas recirculation mechanism for an engine, the mechanism comprising:

a combustion chamber;

an intake passage for supplying air to the combustion chamber;

an exhaust passage for discharging exhaust gas from the combustion chamber;

a recirculation passage connecting the exhaust passage with the intake passage for supplying some of exhaust gas from the exhaust passage to the intake passage;

an EGR valve located in the recirculation passage, the EGR valve serving to adjust the amount of exhaust gas recirculated to the intake passage, wherein foreign matter in exhaust gas in the recirculation passage adheres to part of the EGR valve that is exposed in the recirculation passage;

an adjuster for adjusting the opening amount of the EGR valve in accordance with the running state of the engine; and a controller for forcing the EGR valve fully open when a predetermined full open condition is satisfied while the engine is running thereby removing the foreign matter from the exposed part of the EGR valve, wherein the controller judges that the full open condition is satisfied when the opening amount of the EGR valve, which is determined in accordance with the running state of the engine, is greater than a predetermined value.

19. A method for controlling an EGR valve of an engine, wherein the engine includes a recirculation passage for recirculating some of exhaust gas discharged from a combustion chamber to the combustion chamber, the EGR valve being located in the recirculation passage for adjusting the amount of recirculated exhaust gas, wherein foreign matter in exhaust gas in the recirculation passage adheres to part of the EGR valve that is exposed in the recirculation passage, the method including:

adjusting the opening amount of the EGR valve in accordance with the running state of the engine; and forcing the EGR valve fully open when a predetermined full open condition is satisfied while the engine is running thereby removing the foreign matter from the exposed part of the EGR valve, wherein the ratio of the amount of recirculated exhaust gas to the amount of air supplied to the combustion chamber is represented by an EGR ratio, and wherein the full open condition is a condition in which fluctuations of the EGR ratio will fall within a predetermined acceptable range if the EGR valve is fully opened.

20. The method according to claim 19, further including judging that the full open condition is satisfied when the opening amount of the EGR valve, which is determined in accordance with the running state of the engine, is greater than a predetermined value.

* * * * *